US011820706B2

(12) United States Patent
Dejneka et al.

(10) Patent No.: US 11,820,706 B2
(45) Date of Patent: Nov. 21, 2023

(54) PERALUMINOUS LITHIUM ALUMINOSILICATES WITH HIGH LIQUIDUS VISCOSITY

(71) Applicant: CORNING INCORPORATED, Corning, NY (US)

(72) Inventors: Matthew John Dejneka, Corning, NY (US); Benjamin Zain Hanson, Big Flats, NY (US); Alexander I Priven, Chungchongnam-do (KR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/490,633

(22) Filed: Sep. 30, 2021

(65) Prior Publication Data
US 2022/0017405 A1    Jan. 20, 2022

Related U.S. Application Data

(62) Division of application No. 16/175,016, filed on Oct. 30, 2018, now Pat. No. 11,136,258.
(Continued)

(51) Int. Cl.
*C03C 3/097* (2006.01)
*C03C 3/087* (2006.01)
(Continued)

(52) U.S. Cl.
CPC .............. *C03C 3/097* (2013.01); *C03C 3/087* (2013.01); *C03C 3/091* (2013.01); *C03C 3/093* (2013.01);
(Continued)

(58) Field of Classification Search
CPC ......... C03C 3/097; C03C 3/087; C03C 3/091; C03C 3/093; C03C 21/002; G02F 1/1626; G02F 1/1637; G02F 2200/1634
(Continued)

(56) References Cited

U.S. PATENT DOCUMENTS

| 3,464,880 A | 9/1969 | Rinehart |
| 6,214,429 B1 | 4/2001 | Zou et al. |

(Continued)

FOREIGN PATENT DOCUMENTS

| CN | 1693247 A | 11/2005 |
| CN | 101437769 A | 5/2009 |

(Continued)

OTHER PUBLICATIONS

Chinese Patent Application No. 201880071408.4, Office Action dated Dec. 31, 2021, 19 pages (12 pages of English Translation and 7 pages of Original Document), Chinese Patent Office.

(Continued)

*Primary Examiner* — Ruiyun Zhang

(57) ABSTRACT

The embodiments described herein relate to glass articles that include mechanically durable glass compositions having high liquidus viscosity. The glass articles may include glass compositions having from 50 mol. % to 80 mol. % $SiO_2$; from 7 mol. % to 25 mol. % $Al_2O_3$; from 2 mol. % to about 14 mol. % $Li_2O$; 0.4 mol. % $P_2O_5$; and less than or equal to 0.5 mol. % $ZrO_2$. The quantity ($Al_2O_3$ (mol. %)-$R_2O$ (mol. %)-RO (mol. %)) is greater than zero, where $R_2O$ (mol. %) is the sum of the molar amounts of $Li_2O$, $Na_2O$, $K_2O$, $Rb_2O$, and $Cs_2O$ in the glass composition and RO (mol. %) is the sum of the molar amounts of BeO, MgO, CaO, SrO, BaO, and ZnO in the glass composition. A molar ratio of ($Li_2O$ (mol. %))/($R_2O$ (mol. %)) may be greater or equal to 0.5. In embodiments, the glass composition may include $B_2O_3$. The glass compositions are fusion formable and have high damage resistance.

11 Claims, 2 Drawing Sheets

Related U.S. Application Data

(60) Provisional application No. 62/579,374, filed on Oct. 31, 2017.

(51) Int. Cl.
| | | |
|---|---|---|
| *G06F 1/16* | (2006.01) | |
| *C03C 21/00* | (2006.01) | |
| *C03C 3/091* | (2006.01) | |
| *C03C 3/093* | (2006.01) | |

(52) U.S. Cl.
CPC .......... *C03C 21/002* (2013.01); *G06F 1/1626* (2013.01); *G06F 1/1637* (2013.01); *G06F 2200/1634* (2013.01)

(58) Field of Classification Search
USPC .................. 428/1.62, 1.6; 65/33.8, 33.7, 33.9
See application file for complete search history.

(56) References Cited

U.S. PATENT DOCUMENTS

| | | |
|---|---|---|
| 6,300,264 B1 | 10/2001 | Ohara |
| 6,332,338 B1 | 12/2001 | Hashimoto et al. |
| 6,340,647 B1 | 1/2002 | Koyama et al. |
| 6,376,403 B1 | 4/2002 | Koyama et al. |
| 6,387,510 B1 | 5/2002 | Nakashima et al. |
| 6,399,527 B1 | 6/2002 | Kishimoto et al. |
| 6,537,938 B1 | 3/2003 | Miyazaki |
| 6,673,729 B2 | 1/2004 | Siebers et al. |
| 7,476,633 B2 | 1/2009 | Comte et al. |
| 7,727,917 B2 | 6/2010 | Shelestak et al. |
| 8,697,592 B2 | 4/2014 | Ikenishi et al. |
| 9,403,716 B2 | 8/2016 | Dejneka et al. |
| 10,131,567 B2 | 11/2018 | Beall et al. |
| 2002/0183187 A1 | 12/2002 | Siebers et al. |
| 2005/0250639 A1 | 11/2005 | Siebers et al. |
| 2007/0213192 A1 | 9/2007 | Monique et al. |
| 2015/0132570 A1 | 5/2015 | Lin et al. |
| 2015/0376054 A1 | 12/2015 | Beall et al. |
| 2016/0376187 A1 | 12/2016 | Gross |
| 2017/0341973 A1 | 11/2017 | Gross et al. |

FOREIGN PATENT DOCUMENTS

| | | | |
|---|---|---|---|
| CN | 103068762 A | 4/2013 | |
| CN | 105753314 A | 7/2016 | |
| CN | 108463439 A | 8/2018 | |
| EP | 1236695 A2 | 9/2002 | |
| EP | 2319812 A1 | 5/2011 | |
| JP | 05-009039 A | 1/1993 | |
| JP | 2000-063144 A | 2/2000 | |
| JP | 2000-159540 A | 6/2000 | |
| JP | 2001-076336 A | 3/2001 | |
| JP | 2001-134925 A | 5/2001 | |
| JP | 2002260216 A * | 9/2002 | ............ C03C 3/095 |
| JP | 2002-321940 A | 11/2002 | |
| JP | 2004-238280 A | 8/2004 | |
| JP | 2004-244226 A | 9/2004 | |
| JP | 2004-277252 A | 10/2004 | |
| JP | 2007-197310 A | 8/2007 | |
| JP | 2015-093830 A | 5/2015 | |
| JP | 5737043 B2 | 6/2015 | |
| JP | 2017-519711 A | 7/2017 | |
| TW | I297332 B | 6/2008 | |
| TW | 201736300 A | 10/2017 | |
| WO | 2016/210244 A1 | 12/2016 | |
| WO | 2017/120424 A1 | 7/2017 | |

OTHER PUBLICATIONS

Taiwanese Patent Application No. 107138556, Office Action, dated Mar. 15, 2022, 1 page; Taiwanese Patent Office.

Japanese Patent Application No. 2020-523972, Office Action dated Nov. 24, 2022, 19 pages (English translation only), Japanese Patent Office.

Holtz et al; "Effects Off, 6203 and P205 on the Solubility of Water in Haplogranite Melts Compared to Natural Silicate Melts"; Contrib Mineral Petrol., 1993, vol. 113, No. 4, p. 492-501.

International Search Report and Written Opinion of the International Searching Authorty; PCT/US2018/058221; dated Jan. 7, 2019; 12 Pages; European Patent Office.

Stevenson et al; "The Equivalence of Enthalpy and Shear Stress Relaxation in Rhyolitic Obsidians and Quantification of the Liquid-Glass Transition in Volcanic Processes", J Volcan Geotherm Res., 1995, vol. 68, No. 4, p. 297-306.

Zhilin et al; "Viscosity and Crystallization of Devitrified Glasses Containing Small Amounts of Phosphorus and Titanium Oxides"; Opt. Mekh. Promst. 48, 1982, No. 6, pp. 33-36.

Indian Patent Application No. 202017019818, First Examination Report dated Apr. 4, 2022, 7 pages Original Document; Indian Patent Office.

Korean Patent Application No. 10-2020-7015120, Office action, dated Jul. 3, 2023, 17 pages of English Translation; Korean Patent Office.

* cited by examiner

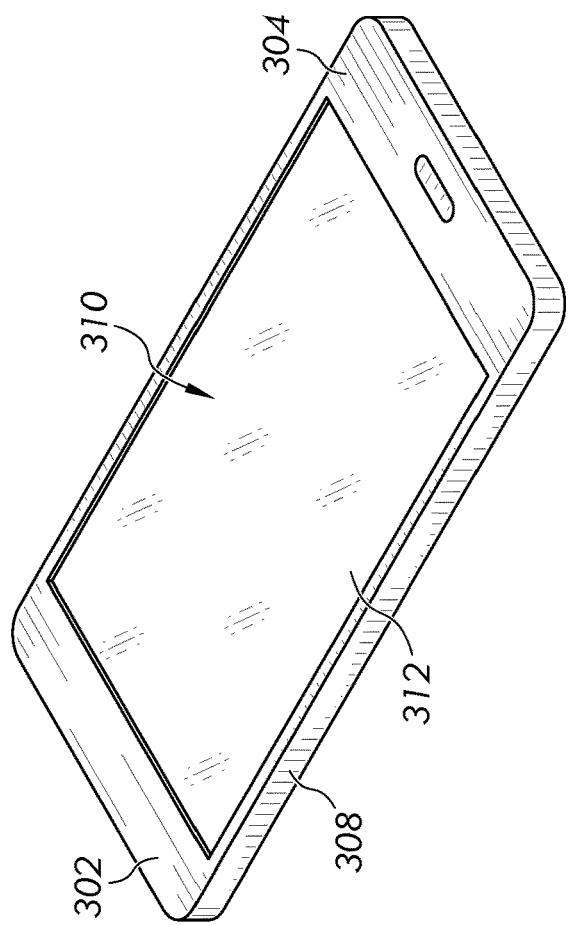
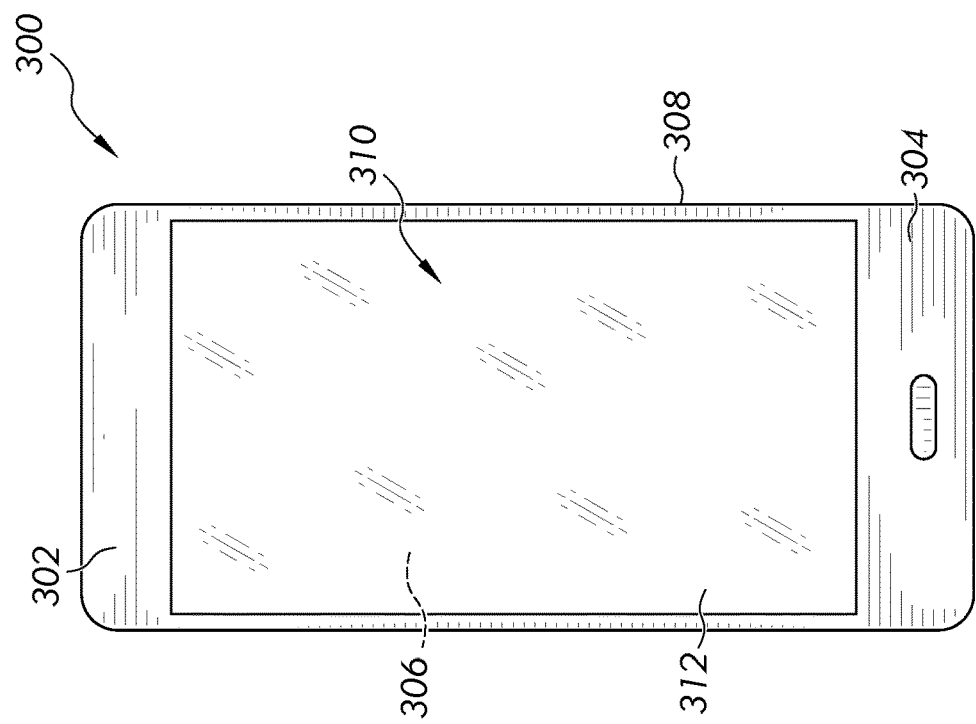
FIG. 2B
FIG. 2A

PERALUMINOUS LITHIUM ALUMINOSILICATES WITH HIGH LIQUIDUS VISCOSITY

CROSS-REFERENCE TO RELATED APPLICATIONS

This application is a divisional of U.S. patent application Ser. No. 16/175,016 filed on Oct. 30, 2018 which, claims the benefit of priority under 35 U.S.C. § 119 of U.S. Provisional Application Ser. No. 62/579,374 filed on Oct. 31, 2017, the content of which is relied upon and incorporated herein by reference in its entirety.

TECHNICAL FIELD

The present specification generally relates to glass compositions and, more specifically, to peraluminous lithium aluminosilicate glass compositions having high liquidus viscosities and high fracture resistance.

BACKGROUND

Historically glass has been used as cover glass for electronic devices because of optical properties and excellent chemical durability relative to other materials. In particular, strengthened glasses have been identified for use in electronic devices as well as in other applications. As strengthened glasses are increasingly being utilized, it has become more important to develop strengthened glass materials having improved survivability, especially when subjected to tensile stresses caused by contact with hard/sharp surfaces, such as asphalt or concrete, experienced in "real world" use and applications. However, certain types of strengthened glasses having high fracture resistance also exhibit high liquidus temperatures and low liquidus viscosity. Some glass compositions with low liquidus viscosity are not suitable for manufacture by downdraw forming processes such as the fusion downdraw process.

SUMMARY

Accordingly, a need exists for glass compositions which exhibit high fracture resistance and mechanical durability and have relatively high liquidus viscosities (for example, greater than 20 kP) to enable the glass compositions to be formed by fusion forming processes.

According to a first embodiment, a glass article comprises a composition, the composition comprising greater than or equal to 50 mol. % and less than or equal to 80 mol. % $SiO_2$, greater than or equal to 7 mol. % and less than or equal to 25 mol. % $Al_2O_3$, greater than or equal to 2 mol. % and less than or equal to 14 mol. % $Li_2O$, greater than or equal to 0.4 mol. % and less than or equal to 10 mol. % $P_2O_5$, and less than or equal to 0.5 mol. % $ZrO_2$. The composition has ($Al_2O_3$ (mol. %)-$R_2O$ (mol. %)-RO (mol. %)) that is greater than zero, where $R_2O$ (mol. %) is the sum of the molar amounts of $Li_2O$, $Na_2O$, $K_2O$, $Rb_2O$, and $Cs_2O$ in the composition and RO (mol. %) is the sum of the molar amounts of BeO, MgO, CaO, SrO, BaO, and ZnO in the composition.

In a second embodiment according to the first embodiment wherein, a molar ratio of ($Li_2O$ (mol. %))/($R_2O$ (mol. %)) in the composition is greater or equal to 0.5. In a third embodiment according to any preceding embodiment, the composition has ($Al_2O_3$ (mol. %)-$R_2O$ (mol. %)-RO (mol. %)-$P_2O_5$ (mol. %)) that is greater or equal to −2 mol. %. In a fourth embodiment according to any preceding embodiment, the composition has ($Al_2O_3$ (mol. %)-$R_2O$ (mol. %)-RO (mol. %)-$P_2O_5$ (mol. %)) that is less than or equal to 2 mol. %. In a fifth embodiment according to any preceding embodiment, the composition has ($Al_2O_3$ (mol. %)-$R_2O$ (mol. %)-RO (mol. %)-$P_2O_5$ (mol. %)) is greater than or equal to −2 mol. % and less than or equal to 2 mol. %.

In a sixth embodiment according to any preceding embodiment, the composition has a liquidus temperature of less than or equal to 1300° C. In a seventh embodiment according to any preceding embodiment, the composition may also have a liquidus viscosity of greater than 20 kP. In an eighth embodiment according to any preceding embodiment, the composition may have a liquidus viscosity of greater than 50 kP.

In a ninth embodiment according to any preceding embodiment, the composition may comprise less than or equal to 14 mol. % $R_2O$. In a tenth embodiment according to any preceding embodiment, the composition may further comprise greater than or equal to 7 mol. % and less than or equal to 14 mol. % $R_2O$. In an eleventh embodiment according to any preceding embodiment, the composition may further comprise less than or equal to 2.5 mol. % $K_2O$. In a twelfth embodiment according to any preceding embodiment, the composition may further comprise greater than or equal to 3 mol. % and less than or equal to 15 mol. % $B_2O_3$. In a thirteenth embodiment according to any preceding embodiment, the composition may have ($Li_2O$ (mol. %)+$Al_2O_3$ (mol. %)) is greater than or equal to two times $B_2O_3$ (mol. %).

In a fourteenth embodiment according to any preceding embodiment, the composition may further comprise greater than or equal to 0.1 mol. % and less than or equal to 6 mol. % $Na_2O$. In a fifteenth embodiment according to any preceding embodiment, the composition may further comprise greater than 0 mol. % and less than or equal to 5 mol. % MgO. In a sixteenth embodiment according to any preceding embodiment, the composition may further comprise greater than 0 mol. % and less than or equal to 5 mol. % ZnO. In a seventeenth embodiment according to any preceding embodiment, the composition may further comprise greater than 0 mol. % and less than or equal to 4 mol. % CaO. In an eighteenth embodiment according to any preceding embodiment, the composition may further comprise greater than 0 mol. % and less than or equal to 4 mol. % SrO. In a nineteenth embodiment according to any preceding embodiment, the composition may further comprise less than or equal to 0.35 mol. % $SnO_2$. In a twentieth embodiment according to any preceding embodiment, the composition may be substantially free of BaO.

In a twenty first embodiment, a glass article comprises a composition, the composition comprising greater than or equal to 50 mol. % and less than or equal to 80 mol. % $SiO_2$, greater than or equal to 7 mol. % and less than or equal to 25 mol. % $Al_2O_3$, greater than or equal to 2 mol. % and less than or equal to 14 mol. % $Li_2O$, greater than or equal to 3 mol. % and less than or equal to 15 mol. % $B_2O_3$, greater than or equal to 0.1 mol. % $Na_2O$, and greater than or equal to 0 mol. % and less than or equal to 4 mol. % $TiO_2$. The composition has ($Al_2O_3$ (mol. %)-$R_2O$ (mol. %)-RO (mol. %)) that is greater than or equal to zero, where $R_2O$ (mol. %) is the sum of the molar amounts of $Li_2O$, $Na_2O$, $K_2O$, $Rb_2O$, and $Cs_2O$ in the composition and RO (mol. %) is the sum of the molar amounts of BeO, MgO, CaO, SrO, BaO, and ZnO in the composition. The composition also has ($Al_2O_3$ (mol.

%)-R$_2$O (mol. %)-RO (mol. %)-P$_2$O$_5$ (mol. %)) that is less than or equal to 2, R$_2$O (mol. %) is less than or equal to 14 mol. %.

In a twenty second embodiment according to the twenty first embodiment, the composition may have a molar ratio of (Li$_2$O (mol. %))/(R$_2$O (mol. %)) is greater than or equal to 0.5. In a twenty third embodiment according to the twenty first or twenty second embodiment, the composition may further comprise greater than or equal to 0.4 mol. % and less than or equal to 10 mol. % P$_2$O$_5$. In a twenty fourth embodiment according to any one of the twenty first through twenty third embodiments, the composition may have (Al$_2$O$_3$ (mol. %)-R$_2$O (mol. %)-RO (mol. %)-P$_2$O$_5$ (mol. %)) that is greater than or equal to −2.

In a twenty fifth embodiment according to any one of the twenty first through twenty fourth embodiments, wherein (Li$_2$O (mol. %)+Al$_2$O$_3$ (mol. %)) is greater than or equal to two times B$_2$O$_3$ (mol. %). In a twenty sixth embodiment according to any one of the twenty first through twenty sixth embodiments, wherein the composition further comprises greater than or equal to 1.5 mol. % and less than or equal to 6 mol. % Na$_2$O. In a twenty seventh embodiment according to any one of the twenty first through twenty sixth embodiments, wherein the composition further comprises less than or equal to 0.35 mol. % SnO$_2$. In a twenty eighth embodiment according to any one of the twenty first through twenty seventh embodiments, wherein the composition has a liquidus temperature of less than or equal to 1300° C. In a twenty ninth embodiment according to any one of the twenty first through twenty eighth embodiments, wherein the composition has a liquidus viscosity of greater than 20 kP.

In a thirtieth embodiment, a glass article includes a composition, the composition comprising greater than or equal to 50 mol. % and less than or equal to 80 mol. % SiO$_2$, greater than or equal to 7 mol. % and less than or equal to 25 mol. % Al$_2$O$_3$, greater than or equal to 2 mol. % and less than or equal to 14 mol. % Li$_2$O, greater than or equal to 0.1 mol. % and less than or equal to 20 mol. % B$_2$O$_3$, greater than or equal to 0.1 mol. % and less than or equal to 20 mol. % P$_2$O$_5$, and less than or equal to 1 mol. % ZrO$_2$. The composition has (Al$_2$O$_3$ (mol. %)-R$_2$O (mol. %)-RO (mol. %)) that is greater than zero, where R$_2$O (mol. %) is the sum of the molar amounts of Li$_2$O, Na$_2$O, K$_2$O, Rb$_2$O, and Cs$_2$O in the composition and RO (mol. %) is the sum of the molar amounts of BeO, MgO, CaO, SrO, BaO, and ZnO in the composition.

In a thirty first embodiment according to the thirtieth embodiment wherein a molar ratio of (Li$_2$O (mol. %))/(R$_2$O (mol. %)) is greater than or equal to 0.5. In a thirty second embodiment according to the thirtieth or thirty first embodiment, wherein (Al$_2$O$_3$ (mol. %)-R$_2$O (mol. %)-RO (mol. %)-P$_2$O$_5$ (mol. %)) is greater than or equal to −2 mol. %. In a thirty third embodiment according to any one of the thirtieth through thirty second embodiments, wherein (Al$_2$O$_3$ (mol. %)-R$_2$O (mol. %)-RO (mol. %)-P$_2$O$_5$ (mol. %)) is greater than or equal to −2 mol. % and less than or equal to 2 mol. %. In a thirty fourth embodiment according to any one of the thirtieth through thirty third embodiments, wherein (Al$_2$O$_3$ (mol. %)-R$_2$O (mol. %)-RO (mol. %)-P$_2$O$_5$ (mol. %)) is greater than or equal to −2 mol. % and less than or equal to 2 mol. %. In a thirty fifth embodiment according to any one of the thirtieth through thirty fourth embodiments, wherein the composition comprises less than or equal to 14 mol. % R$_2$O. In a thirty sixth embodiment according to any one of the thirtieth through thirty fifth embodiments, wherein the composition comprises greater than or equal to 7 mol. % and less than or equal to 14 mol. % R$_2$O. In a thirty seventh embodiment according to any one of the thirtieth through thirty sixth embodiments, wherein (Li$_2$O (mol. %)+Al$_2$O$_3$ (mol. %)) is greater than or equal to two times B$_2$O$_3$ (mol. %). In a thirty eighth embodiment according to any one of the thirtieth through thirty seventh embodiments, wherein the composition further comprises greater than or equal to 1 mol. % and less than or equal to 6 mol. % Na$_2$O. In a thirty ninth embodiment according to any one of the thirtieth through thirty eighth embodiments, wherein the composition further comprises greater than 0 mol. % and less than or equal to 0.35 mol. % SaO$_2$. In a fortieth embodiment according to any one of the thirtieth through thirty ninth embodiments, wherein the composition has a liquidus temperature of less than or equal to 1300° C. In a forty first embodiment according to any one of the thirtieth through fortieth embodiments, wherein the composition has a liquidus viscosity of greater than 20 kP.

In a forty-second embodiment, a glass article comprises a composition, the composition comprising: greater than or equal to 50 mol. % and less than or equal to 80 mol. % SiO$_2$; greater than or equal to 2 mol. % and less than or equal to 25 mol. % Al$_2$O$_3$; greater than or equal to 2 mol. % and less than or equal to 15 mol. % Li$_2$O; wherein SiO$_2$ (mol %)≥[4*Li$_2$O+6*(Na$_2$O+K$_2$O)+2.5*MgO+2*(CaO+SrO+BaO)] (mol %), wherein (Al$_2$O$_3$ (mol. %)-R$_2$O (mol. %)-RO (mol. %)) is greater than zero, where R$_2$O (mol. %) is the sum of the molar amounts of Li$_2$O, Na$_2$O, K$_2$O, Rb$_2$O, and Cs$_2$O in the composition and RO (mol. %) is the sum of the molar amounts of BeO, MgO, CaO, SrO, BaO, and ZnO in the composition, wherein a molar ratio of (Li$_2$O (mol. %))/(R$_2$O (mol. %)) is greater or equal to 0.35, wherein P$_2$O$_5$ (mol %)/[(Al$_2$O$_3$—R$_2$O—RO)] (mol %) is greater than or equal to 0.25, wherein TiO$_2$ (mol %)+ZrO$_2$ (mol %) is greater than or equal to 0 mol. % and less than or equal to 1 mol. %, wherein a total content of rare earth metal oxides is greater than or equal to 0 mol. % and less than or equal to 0.5 mol %, and wherein A is greater than or equal to 17, where:

$$A=13.2+P*[(1/673-1(A.P.+273))],$$

$$P=0.6/[(1/(A.P.+273))-(1/(T_{12}+273))],$$

A.P. is the annealing point in ° C., and

T$_{12}$ is the temperature in ° C. corresponding to when the glass has a viscosity of 10$^{12}$ Poises.

In a forty-third embodiment according to the forty-second embodiment, wherein P$_2$O$_5$ (mol %)/[(Al$_2$O$_3$—R$_2$O—RO)] (mol %) is greater than or equal to 0.8 and less than or equal to 1.25. In a forty-fourth embodiment according to the forty-second embodiment wherein P$_2$O$_5$ (mol %)/[(Al$_2$O$_3$—R$_2$O—RO)](mol %) is greater than or equal to 0.9 and less than or equal to 1.1. In a forty-fifth embodiment according to any one of the forty-second through forty-fourth embodiments, wherein a Young's modulus is greater than or equal to 70 GPa. In a forty-sixth embodiment according to any one of the forty-second through forty-fourth embodiments, wherein a Young's modulus is greater than or equal to 80 GPa. In a forty-seventh embodiment according to any one of the forty-second through forty-sixth embodiments, wherein a fracture toughness is greater than or equal to 0.7 MPa*m$^{1/2}$. In a forty-eighth embodiment according to any one of the forty-second through forty-sixth embodiments, wherein a fracture toughness is greater than or equal to 0.8 MPa*m$^{1/2}$. In a forty-ninth embodiment according to any one of the forty-second through forty-eighth embodiments, wherein A is greater than or equal to 19.

In a fiftieth embodiment, a consumer electronic product includes a housing having a front surface, a back surface and side surfaces and electrical components provided at least partially within the housing, the electrical components including at least a controller, a memory, and a display, the display being provided at or adjacent the front surface of the housing. The consumer electronic product further includes a cover substrate disposed over the display. At least one of a portion of the housing or the cover substrate comprises the glass article of any one of the embodiments disclosed herein.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2A is a plan view of an exemplary electronic device incorporating any of the glass articles disclosed herein; and FIG. 2B is a perspective view of the exemplary electronic device of FIG. 2A.

DETAILED DESCRIPTION

Figure 1:
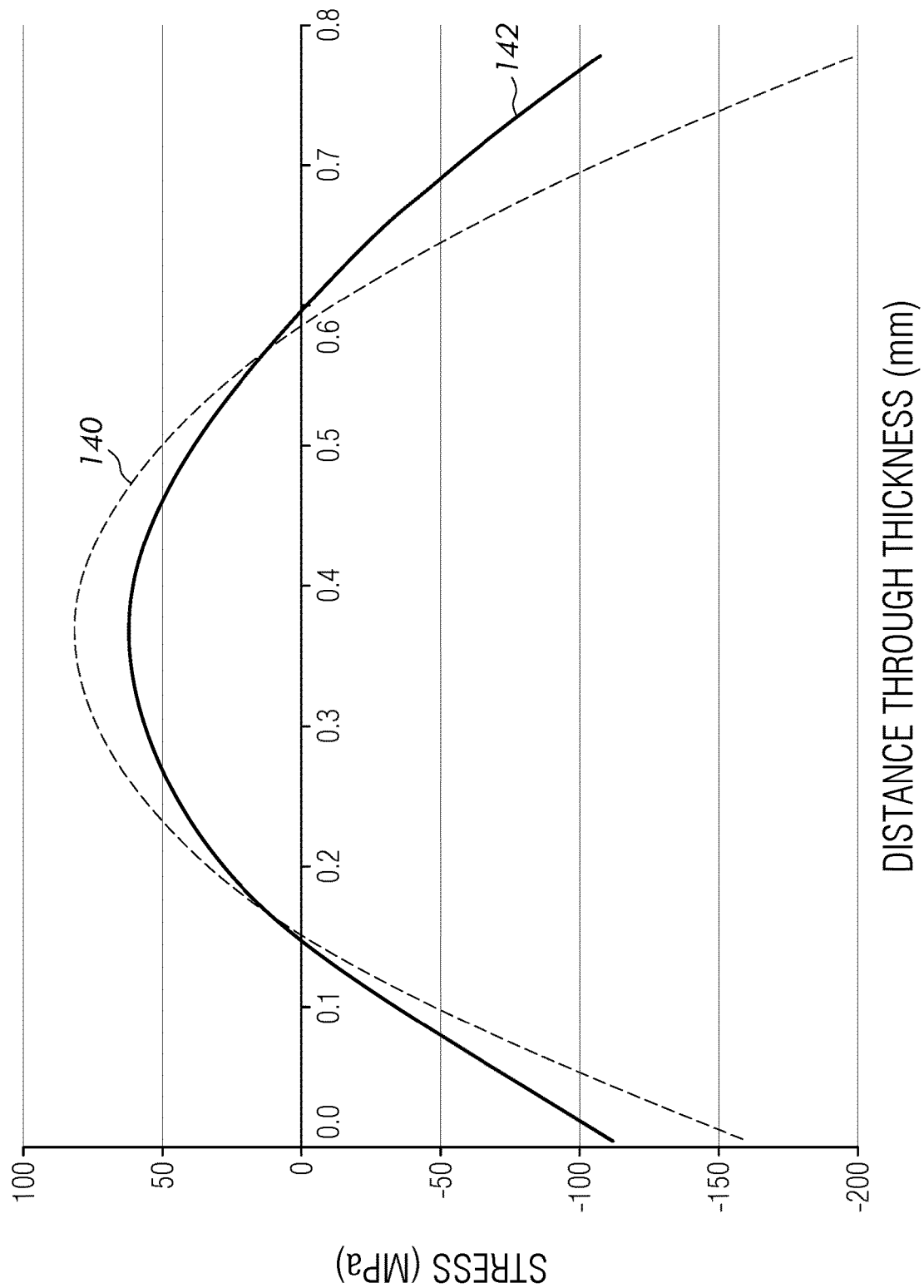
FIG. 1 graphically depicts the stress (x-axis) profile across the thickness (y-axis) of the inventive glass compositions after ion exchange strengthening.

Reference will now be made in detail to various embodiments of glass compositions which exhibit improved drop performance and greater liquidus viscosity, which provides a more mechanically durable glass that can be produced by fusion downdraw forming processes. Such glass compositions are suitable for use in various applications including, without limitation, as cover glass for electronics. The glass compositions may also be chemically strengthened thereby imparting increased mechanical durability to the glass. The glass compositions described herein may generally be described as peraluminous lithium aluminosilicates. Thus the glass compositions described herein comprise silica ($SiO_2$), alumina ($Al_2O_3$), and lithium oxide ($Li_2O$). In some embodiments, the glass compositions may also comprise alkali oxides in addition to lithium oxide (such as $Na_2O$, and/or $K_2O$ for example), and alkaline earth oxides (such as MgO and/or CaO for example) in amounts which impart chemical and mechanical durability to the glass composition and liquidus viscosity sufficient to allow the glass composition to be produced using fusion downdraw forming processes. Moreover, the alkali oxides present in the glass compositions facilitate chemically strengthening the glass compositions by ion exchange. In some embodiments, the glass composition may include $P_2O_5$, $B_2O_3$, or both, which may be incorporated into the glass composition to improve the liquidus viscosity, damage resistance, or both. Various embodiments of the glass compositions will be described herein and further illustrated with reference to specific examples.

The term "softening point," as used herein, refers to the temperature at which the viscosity of the glass composition is $10^{7.6}$ poise.

The term "annealing point," as used herein, refers to the temperature determined according to ASTM C598-93, at which the viscosity of a glass of a given glass composition is approximately $10^{13.2}$ poise.

The term "$T_{12}$", as used herein, refers to the temperature determined according to ASTM C598-93, at which the viscosity of a glass of a given glass composition is approximately $10^{12}$ poise.

The terms "strain point" and "$T_{strain}$" as used herein, refers to the temperature determined according to ASTM C598-93, at which the viscosity of a glass at a given glass composition is approximately $10^{14.7}$ poise.

The term "liquidus temperature" refers to the temperature above which the glass composition is completely liquid with no crystallization of constituent components of the glass. The liquidus temperature of the glass is measured in accordance with ASTM C829-81 (2015), titled "Standard Practice for Measurement of Liquidus Temperature of Glass by the Gradient Furnace Method".

The term "liquidus viscosity" refers to the viscosity of the glass composition at the liquidus temperature of the glass composition. The liquidus viscosity of the glass at the liquidus temperature is measured in accordance with ASTM C965-96(2012), titled "Standard Practice for Measuring Viscosity of Glass Above the Softening Point".

The term "CTE," as used herein, refers to the coefficient of linear thermal expansion of the glass composition over a temperature range from room temperature (RT) to 300° C. and is determined using a push-rod dilatometer in accordance with ASTM E228-11.

In the embodiments of the glass compositions described herein, the concentrations of constituent components (e.g., $SiO_2$, $Al_2O_3$, and the like) are specified in mole percent (mol. %) on an oxide basis, unless otherwise specified. Mole percent of a constituent in the glass composition refers to the number of moles of the constituent per unit mole of the glass composition times 100.

The term "peraluminous" as used herein refers to glasses where $Al_2O_3$ (mol %) is greater than the sum of the $R_2O$ mol. % (alkali oxides) and RO mol. % (alkaline oxides and ZnO).

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "tramp," when used to describe a particular constituent component in a glass composition, refers to a constituent component that is not intentionally added to the glass composition and is present in amounts less than 0.05 mol. %. Tramp components may be unintentionally added to the glass composition as an impurity in another constituent component or through migration of the tramp component into the composition during processing of the glass composition.

The glass compositions described herein are lithium peraluminous aluminosilicate glass compositions which may generally include a combination of $SiO_2$, $Al_2O_3$, and $Li_2O$, and in some embodiments, may include additional alkali oxides $Na_2O$, and/or $K_2O$. The glass compositions are suitable for chemical strengthening by ion exchange and have liquidus viscosities sufficiently high so that the glass compositions may be formed by fusion downdraw forming processes. After ion exchange, the resultant glasses exhibit greater drop performance compared to conventional cover glasses for portable electronics. In some embodiments, the glass compositions may also include $P_2O_5$, $B_2O_3$, at least one alkaline earth oxide, or combinations of these. These components may be added to further increase the liquidus viscosity and/or improve the mechanical durability and drop performance of the glass. In some embodiments the glass compositions may further comprise lesser amounts of one or more additional oxides such as, for example, $SnO_2$, $ZrO_2$, ZnO, $TiO_2$, $As_2O_3$ or the like, as described herein. These components may be added as fining agents and/or to further enhance the chemical durability of the resultant glass.

In the embodiments of the glass compositions described herein, $SiO_2$ is the largest constituent of the composition and, as such, is the primary constituent of the resulting glass network. $SiO_2$ enhances the chemical durability of the glass and the resistance of the glass composition to decomposition in acid and the resistance of the glass composition to decomposition in water. If the content of $SiO_2$ is too low, the chemical durability and chemical resistance of the glass may be reduced and the glass may be susceptible to corrosion. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises $SiO_2$ in an amount greater than or equal to 50 mol. % and less than or equal to about 80 mol. %, less than or equal to 75 mol. %, less than or equal to 74 mol. %, less than or equal to 72 mol. %, or even less than or equal to 70 mol. % and any ranges or subranges therebetween. In some embodiments, the amount of $SiO_2$ in the glass composition may be greater than about 58 mol. %, greater than about 65 mol. %, or even greater than about 67 mol. %. In some other embodiments, the amount of $SiO_2$ in the glass composition may be greater than 70 mol. %, greater than 72 mol. %, or even greater than 74 mol. %. For example, in some embodiments, the glass composition may include from about 58 mol. % to about 80 mol. %, from about 58 mol. % to about 75 mol. %, from about 58 mol. % to about 74 mol. %, from about 58 mol. % to about 72 mol. %, or even from about 58 mol. % to about 70 mol. % $SiO_2$. In some other embodiments, the glass composition may include from about 65 mol. % to about 80 mol. %, from 65 mol. % to about 75 mol. %, from about 65 mol. % to about 74 mol. %, from about 65 mol. % to about 72 mol. %, or even from about 65 mol. % to about 70 mol. % $SiO_2$. In some other embodiments, the glass composition may include from about 67 mol. % to about 80 mol. %, from about 67 mol. % to about 75 mol. %, from about 67 mol. % to about 74 mol. %, from about 67 mol. % to about 72 mol. %, or even from about 67 mol. % to about 70 mol. % $SiO_2$. In still other embodiments, the glass composition may comprise greater than or equal to 58 mol. % and less than or equal to 74 mol. % $SiO_2$. In some embodiments, the glass composition comprises greater than or equal to 65 mol. % and less than or equal to 72 mol. % $SiO_2$. In still other embodiments, the glass composition may comprise greater than or equal to 67 mol. % and less than or equal to 70 mol. % $SiO_2$. In some embodiments, the mol % of $SiO_2$ in the glass meets the following relationship: $SiO_2$ (mol %)$\geq$[4*$Li_2O$+6*($Na_2O$+$K_2O$)+2.5*MgO+2*(CaO+SrO+BaO)] (mol %). Without being bound by theory, it is believed that the silica content should meet the above relationship to prevent crystallization of alumina-rich refractory minerals.

The glass compositions described herein may further include $Al_2O_3$. $Al_2O_3$, in conjunction with alkali oxides present in the glass compositions such as $Li_2O$, or the like, improves the susceptibility of the glass to ion exchange strengthening. More specifically, increasing the amount of $Al_2O_3$ in the glass compositions increases the speed of ion exchange in the glass and increases the compressive stress produced in the compressive layer of the glass as a result of ion exchange. Alkali oxides compensated with $Al_2O_3$ exhibit greater mobility during ion exchange compared to alkali oxides that are not compensated by $Al_2O_3$. The $Al_2O_3$ may also increase the hardness and damage resistance of the glass. However, the liquidus viscosity of the glass decreases with increasing concentration of the $Al_2O_3$ in the glass compositions. If the concentration of $Al_2O_3$ in the glass compositions is too great, the liquidus viscosity of the glass composition decreases, which may cause the glass composition to crystallize during production in a fusion downdraw process. In the embodiments described herein, $Al_2O_3$ is present in the glass compositions in $Al_2O_3$ (mol. %), while the alkali oxides are present in the glass compositions in $R_2O$ (mol. %), where $R_2O$ (mol. %) is equal to the sum of the mole fractions of $Li_2O$, $Na_2O$, $K_2O$, $Rb_2O$, and $Cs_2O$.

In some embodiments, the molar ratio ($Al_2O_3$ (mol. %))/($R_2O$ (mol. %)) in the glass compositions is greater than or equal to 1 in order to fully compensate the alkali oxides with $Al_2O_3$ and facilitate the aforementioned susceptibility to ion exchange strengthening. Stated in another way, the glass compositions may have ($Al_2O_3$ (mol. %)-$R_2O$ (mol. %)) that is greater than or equal to zero, where $R_2O$ is the sum of the molar amounts of $Li_2O$, $Na_2O$, $K_2O$, $Rb_2O$, and $Cs_2O$ in the glass composition. Specifically, the diffusion coefficient or diffusivity D of the glass compositions relates to the rate at which alkali ions penetrate into the glass surface during ion exchange. Glass compositions having a ratio ($Al_2O_3$ (mol. %))/($R_2O$ (mol. %)) equal to 1 have greater diffusivity (i.e., mobility) of the alkali oxide ions through the glass compositions compared to glasses having the same total alkali content ($R_2O$ (mol. %)) but a ratio ($Al_2O_3$ (mol. %))/($R_2O$ (mol. %)) less than 1 or greater than 1. Glasses in which the alkali ions have a greater diffusivity can obtain a greater depth of layer for a given ion exchange immersion time and ion exchange temperature than glasses in which the alkali ions have a lower diffusivity.

In embodiments described herein, alkaline earth oxides (e.g., BeO, MgO, CaO, SrO, and BaO) and/or zinc oxide (ZnO) may be present in the glass compositions. The total amount of alkaline earth oxides and ZnO in the glass compositions may be RO (mol. %). The total amount of alkaline earth oxides without BeO and ZnO (i.e., RO (mol. %)-BeO (mol. %)-ZnO (mol. %)) may be A mol. %. Increasing the amount of $Al_2O_3$ in the glass compositions improves ion exchange in the glass compositions. However, the liquidus temperature increases rapidly when $Al_2O_3$ (mol. %) exceeds ($R_2O$ (mol. %)+RO (mol. %)) by more than 1 or 2 mol. %. BeO and ZnO may not be as active as the other alkaline earth oxides and may not have as much impact on the ion exchange characteristics or liquidus temperature as the other alkaline earth oxides. Therefore, the liquidus temperature may increase rapidly when $Al_2O_3$ (mol. %) exceeds ($R_2O$ (mol. %)+A (mol. %)) as well. As the liquidus temperature of the glass increases, the liquidus viscosity of the glass decreases. If the amount of $Al_2O_3$ in the glass composition is too high, then the liquidus temperature increases to the point that the glass is no longer fusion formable in a fusion downdraw process due to devitrification in the glass. Devitrification refers to the crystallization of one or more constituents of the glass composition during formation (e.g., formation of cristobalite, spodumene, mullite, rutile, corundum, other crystalline constituent, or combinations of these). Thus, in some embodiments, $Al_2O_3$ (mol. %) in the glass compositions may not exceed the sum ($R_2O$ (mol. %)+RO (mol. %)) or ($R_2O$ (mol. %)+A (mol. %)) by more than 10 mol. %. In some embodiments, $Al_2O_3$ (mol. %) does not exceed the sum ($R_2O$ (mol. %)+RO (mol. %)) or ($R_2O$ (mol. %)+A (mol. %)) by more than 5 mol. %, by more than 2 mol. %, or even by more than 1 mol. %. For example, the glass compositions may have ($Al_2O_3$ (mol. %)-$R_2O$ (mol. %)-RO (mol. %)) that is less than or equal to 10 mol. %, less than or equal to 5 mol. %, less than or equal to 2 mol. %, or even less than or equal to 1 mol. %, where RO (mol. %) is the sum of the molar amounts of BeO, MgO, CaO, SrO, BaO, and ZnO. In some embodiments, ($Al_2O_3$ (mol. %)-$R_2O$ (mol. %)-RO (mol. %)) may be greater than 0 mol. % and less than or equal to 10 mol. %, greater than 0 mol. % and less than or equal to 5 mol. %, greater than 0 mol. % and less than or equal to 2 mol. %, or even greater than 0 mol. % and less than or equal to 1 mol. %. In some embodiments, the glass compositions may be substantially free of phosphorous oxide ($P_2O_5$). In these embodiments in which $P_2O_5$ is not present in the glass composition to compensate for the excess $Al_2O_3$, the quantity ($Al_2O_3$ (mol. %)-$R_2O$ (mol. %)-RO (mol. %)) may be less than or equal to 4 mol. %, less than or equal to 2 mol. %, or even less than or equal to 1 mol. % in the glass compositions.

The glass compositions described herein generally include $Al_2O_3$ in an amount greater than or equal to about 2 mol. % and less than or equal to about 25 mol. % or greater than or equal to about 7 mol. % and less than or equal to about 25 mol. % and any ranges or subranges therebetween. In some embodiments, the amount of $Al_2O_3$ in the glass compositions may be greater than or equal to about 10 mol. % and less than or equal to about 18 mol. %. In some other embodiments, the amount of $Al_2O_3$ in the glass compositions may be greater than or equal to about 12 mol. % to less than or equal to about 16 mol. %. In some other embodiments, the amount of $Al_2O_3$ in the glass compositions may be greater than or equal to about 10 mol. % to less than or equal to about 16 mol. %. In still other embodiments, the amount of $Al_2O_3$ in the glass compositions may be greater than or equal to about 12 mol. % to less than or equal to about 18 mol. %.

The glass compositions also include one or more alkali oxides. The alkali oxides facilitate the ion exchangeability of the glass compositions and, as such, facilitate chemically strengthening the glass. The alkali oxides may include one or more of $Li_2O$, $Na_2O$, $K_2O$, $Rb_2O$, and $Cs_2O$. As previously discussed, the alkali oxides are generally present in the glass compositions in a total concentration of $R_2O$ mol. %. Increasing the amount of alkali oxides improves ion exchange in the resultant glass. However, if the amount of alkali oxides is too high, such as higher than 14 mol. %, the liquidus viscosity of the glass composition decreases. When the liquidus viscosity decreases, lowering the temperature of the molten glass compositions to increase the viscosity for fusion forming results in devitrification in the glass compositions during forming. Therefore, in some embodiments, the glass composition may have less than or equal to 14 mol. % $R_2O$ (mol. %). In some embodiments, the glass composition may include greater than or equal to 7 (mol. %) and less than or equal to 14 (mol. %) $R_2O$.

The ion exchangeability of the glass formed from the glass compositions described herein is primarily imparted to the glass by the amount of the alkali oxide $Li_2O$ initially present in the glass compositions prior to ion exchange. Accordingly, in the embodiments of the glass compositions described herein, the alkali oxide present in the glass compositions includes at least $Li_2O$. Lithium ions are smaller than other alkali ions, such as sodium ions ($Na^+$), potassium ions ($K^+$), rubidium ions ($Rb^+$), and cesium ions ($Cs^+$) for example. When glasses formed from the glass compositions comprising $Li_2O$ are ion exchanged with sodium or potassium ions, the ion exchange of the larger sodium and/or potassium ions for the smaller lithium ions occurs rapidly compared to ion exchange of the sodium and/or potassium ions with other sodium or potassium ions. Thus, a greater amount of $Li_2O$ in the glass compositions relative to the other alkali oxides results in better ion exchange performance of the resultant glass. For example, ion exchange of the lithium ions in the glass with sodium and/or potassium ions results in greater compressive stress and greater depth of the compressive layer of the glass compared to ion exchange of other alkali ions in the glass with sodium and/or potassium ions. When ion exchanging the glass with sodium ions, the greater the amount of $Li_2O$ in the glass relative to the other alkali oxides, the greater the compressive stress on the surface. Additionally, alkali oxides may create non-bridging oxygens in the glass network that may reduce chemical durability, decrease the viscosity, and slow down the process of ion exchange. Therefore, in order to achieve the desired compressive strength and depth of layer in the glass upon ion exchange strengthening, in embodiments, the molar ratio of the $Li_2O$ to total $R_2O$ in the glass compositions is greater than or equal to 0.35, where $R_2O$ is the total molar amount of alkali oxides $Li_2O$, $Na_2O$, $K_2O$, $Rb_2O$, and $Cs_2O$ in the glass compositions (i.e., ($Li_2O$ (mol. %))/($R_2O$ (mol. %)) is greater than or equal to 0.35). If the molar ratio of $Li_2O$ to $R_2O$ in the glass composition is less than 0.35, the compressive stress resulting from ion exchange is reduced resulting in a weaker glass and decreased drop performance of the glass. In some embodiments, the molar ratio of $Li_2O$ to $R_2O$ in the glass compositions may be greater than or equal to 0.4, greater than or equal to 0.5, greater than or equal to 0.6, greater than or equal to 0.7, or even greater than or equal to 0.8.

Specifically, in order to achieve the desired compressive stress and depth of compression in the glass upon ion exchange strengthening, in embodiments, the glass compositions include $Li_2O$ in an amount from about 2 mol. % to about 15 mol. % or from about 2 mol. % to about 14 mol. % and all ranges and subranges therebetween. If the amount of $Li_2O$ in the glass compositions is too low, such as less than 2 mol. % for example, the rate of ion exchange in the glass decreases and the compressive stress in the glass created by ion exchange also decreases. If the amount of $Li_2O$ in the glass compositions is too high, such as greater than 14 mol. % or 15 mol. % for example, the liquidus viscosity of the glass compositions decreases and the glass may crystallize during fusion forming. In some embodiments, the glass compositions include at least about 4 mol. % $Li_2O$. For example, the concentration of $Li_2O$ in the glass compositions may be greater than 5 mol. %, or greater than 6 mol. %. In some embodiments, the glass compositions may have greater than or equal to 4 mol. % $Li_2O$, greater than or equal to 5 mol. % $Li_2O$, or even greater than or equal to 6 mol. % $Li_2O$. In some embodiments, the glass compositions include less than about 12 mol. % $Li_2O$, less than about 10 mol. % $Li_2O$, or even less than about 9 mol. %

$Li_2O$. In some embodiments, the glass compositions may have less than or equal to 14 mol. % $Li_2O$, less than or equal to 12 mol. % $Li_2O$, less than or equal to 10 mol. % $Li_2O$, or even less than or equal to 9 mol. % $Li_2O$. For example, in some embodiments the glass compositions may include greater than or equal to 2 mol. % and less than or equal to 14 mol. % $Li_2O$, greater than or equal to 4 mol. % and less than or equal to 12 mol. % $Li_2O$, greater than or equal to 5 mol. % and less than or equal to 10 mol. % $Li_2O$, or even greater than or equal to 6 mol. % and less than or equal to 9 mol. % $Li_2O$.

As noted above, the alkali oxide in the glass compositions may further include $Na_2O$. The amount of $Na_2O$ present in the glass compositions also relates to the ion exchangeability of the glass made from the glass compositions. Specifically, the presence of $Na_2O$ in the glass compositions may increase the ion exchange rate during ion exchange strengthening of the glass by increasing the diffusivity of ions through the glass matrix. However, as the amount of $Na_2O$ present in the glass compositions increases, the compressive stress obtainable in the glass through ion exchange decreases as a result of the exchange of the sodium ions with other sodium ions. For example, ion exchange of a sodium ion with another sodium ion of the same size results in no net increase in the compressive stress in the compressive layer. Thus, increasing the $Na_2O$ amount in the glass compositions decreases the compressive stress created in the glass by the ion exchange. Accordingly, it is desirable to limit the amount of $Na_2O$ present in the glass compositions. In some embodiments, the amount of $Na_2O$ is greater than or equal to 0 mol. % and less than or equal to 6 mol. % and all ranges and subranges therebetween. In some embodiments, the glass compositions include at least about 0.1 mol. % of $Na_2O$. For example, the glass compositions may have greater than or equal to 0.1 mol. % $Na_2O$, greater or equal to 0.2 mol. % $Na_2O$, greater than or equal to 0.3 mol. % $Na_2O$, greater than or equal to 0.5 mol. % $Na_2O$, greater than or equal to 1 mol. % $Na_2O$, or even greater than or equal to 1.5 mol. % $Na_2O$. In some embodiments, the glass compositions may include less than or equal to 6 mol. % $Na_2O$, less or equal to 5 mol. % $Na_2O$, or even less than or equal to about 4 mol. % $Na_2O$. For example, in some embodiments the glass compositions may include greater than or equal to 0 mol. % and less than or equal to 6 mol. % $Na_2O$, greater than or equal to 0.1 mol. % and less than or equal to 6 mol. % $Na_2O$, greater than or equal to 0.2 mol. % and less than or equal to 5 mol. % $Na_2O$, greater than or equal to 0.3 mol. % and less than or equal to 4 mol. % $Na_2O$, greater than or equal to 0.5 mol. % and less than or equal to 6 mol. % $Na_2O$, greater than or equal to 1 mol. % and less than or equal to 6 mol. % $Na_2O$, or greater than or equal to 1.5 mol. % and less than or equal to 6 mol. % $Na_2O$. Accordingly, it should be understood that $Na_2O$ need not be present in the glass compositions. However, when $Na_2O$ is included in the glass compositions, the amount of $Na_2O$ in the glass compositions is generally less than about 6 mol. %.

As noted above, the alkali oxide in the glass compositions may further include $K_2O$. The amount of $K_2O$ present in the glass compositions also relates to the ion exchangeability of the glass composition. Specifically, as the amount of $K_2O$ present in the glass compositions increases, the compressive stress in the glass obtainable through ion exchange decreases as a result of the exchange of potassium and sodium ions. Accordingly, it is desirable to limit the amount of $K_2O$ present in the glass compositions. In some embodiments, the amount of $K_2O$ in the glass compositions is greater than or equal to 0 mol. % and less than or equal to 2.5 mol. % and all ranges and subranges therebetween. In some embodiments, the amount of $K_2O$ in the glass compositions is less or equal to 1 mol. % or even less than or equal to 0.25 mol. %. In embodiments, the glass compositions may include greater than or equal to about 0.01 mol. % and less than or equal to about 2.5 mol. % $K_2O$, greater than or equal to about 0.01 mol. % and less than or equal to about 1 mol. % $K_2O$, or even greater than or equal to about 0.01 mol. % and less than or equal to about 0.25 mol. % $K_2O$. Accordingly, it should be understood that $K_2O$ need not be present in the glass compositions. However, when $K_2O$ is included in the glass compositions, the amount of $K_2O$ is generally less than about 2.5 mol. %.

The glass compositions may also include phosphorous oxide ($P_2O_5$). The presence of $P_2O_5$ increases the liquidus viscosity of the glass compositions by suppressing the crystallization of mullite in the glass compositions. The liquidus temperature of the glass compositions increases rapidly when the amount of $Al_2O_3$ exceeds the sum of the amounts of alkali oxides ($R_2O$ mol. %) and alkaline earth oxides (RO mol. %) in the glass composition by more than 2 mol. %, or even by more than 1 mol. %. When $Al_2O_3$ (mol. %) is greater than ($R_2O$ (mol. %)+RO (mol. %)) by more than 1 mol. %, the presence of $P_2O_5$ in the glass composition compensates for the excess $Al_2O_3$ by decreasing the liquidus temperature, thus, increasing the liquidus viscosity of the glass composition. In some embodiments, the glass compositions may have an amount of $P_2O_5$ sufficient to compensate for the excess $Al_2O_3$. For example, in some embodiments, the glass compositions may have an amount of $P_2O_5$ sufficient so that ($Al_2O_3$ (mol. %)-$R_2O$ (mol. %)-RO (mol. %)-$P_2O_5$ (mol. %)) is less than or equal to 2 or even less than or equal to 1. In some embodiments, the glass compositions may have an amount of $P_2O_5$ so that ($Al_2O_3$ (mol. %)-$R_2O$ (mol. %)-RO (mol. %)-$P_2O_5$ (mol. %)) is greater than or equal to −2 or even greater than or equal to −1. In some embodiments, the glass compositions may have an amount of $P_2O_5$ sufficient so that ($Al_2O_3$ (mol. %)-$R_2O$ (mol. %)-RO (mol. %)-$P_2O_5$ (mol. %)) is greater than or equal to −2 and less than or equal to 2, or even greater than or equal to −1 and less than or equal to 1. In some embodiments, the presence of $P_2O_5$ also achieves the effects noted above, when the ratio of $P_2O_5$ (mol %)/[($Al_2O_3$—$R_2O$—RO)](mol %) is in a range from 0.25 to 1.5, from 0.25 to 1.4, from 0.25 to 1.3, from 0.25 to 1.25, from 0.25 to 1.2, from 0.25 to 1.1, from 0.25 to 1, from 0.25 to 0.9, from 0.25 to 0.8, from 0.25 to 0.7, from 0.25 to 0.6, from 0.5 to 1.5, from 0.5 to 1.4, from 0.5 to 1.3, from 0.5 to 1.25, from 0.5 to 1.2, from 0.5 to 1.1, from 0.5 to 1, from 0.5 to 0.9, from 0.5 to 0.8, from 0.5 to 0.7, from 0.5 to 0.6, from 0.6 to 1.5, from 0.6 to 1.4, from 0.6 to 1.3, from 0.6 to 1.25, from 0.6 to 1.2, from 0.6 to 1.1, from 0.6 to 1, from 0.6 to 0.9, from 0.6 to 0.8, from 0.6 to 0.7, from 0.7 to 1.5, from 0.7 to 1.4, from 0.7 to 1.3, from 0.7 to 1.25, from 0.7 to 1.2, from 0.7 to 1.1, from 0.7 to 1, from 0.7 to 0.9, from 0.7 to 0.8, from 0.8 to 1.5, from 0.8 to 1.4, from 0.8 to 1.3, from 0.8 to 1.25, from 0.8 to 1.2, from 0.8 to 1.1, from 0.8 to 1, from 0.8 to 0.9, from 0.9 to 1.5, from 0.9 to 1.4, from 0.9 to 1.3, from 0.9 to 1.25, from 0.9 to 1.2, from 0.9 to 1.1, or from 0.9 to 1, and all ranges and subranges therebetween. In some embodiments, the glass compositions do not include $P_2O_5$, and as previously described, in the absence of the $P_2O_5$, the glass compositions have ($Al_2O_3$ (mol. %)-$R_2O$ (mol. %)-RO (mol. %)) that is greater than or equal to 0 and less than or equal to 2, or even greater than or equal to 0 and less than or equal to 1.

The amount of $P_2O_5$ also relates to the ion exchangeability of the glass made from the glass composition. Increasing the amount of $P_2O_5$ in the glass compositions may increase the rate of ion exchange in the glass by creating space within the glass network. $P_2O_5$ may also contribute to enhancing the damage resistance of the glass made from the glass compositions. However, increasing the amount of $P_2O_5$ in the glass compositions decreases the amount of compressive stress attainable through ion exchange strengthening of the glass. Additionally, increasing the amount of $P_2O_5$ too high may cause crystallization of aluminum phosphate ($AlPO_4$) at high temperatures, which may increase the liquidus temperature of the class compositions. If the amount of $P_2O_5$ in the glass compositions is too high, then the durability of the glass may also be reduced. Therefore, the total amount of $P_2O_5$ in the glass composition may be limited, such as less than or equal to 20 mol. % for example. In some embodiments, the glass compositions include $P_2O_5$ in an amount from about 0.1 mol. % to about 20 mol. % and all ranges and subranges therebetween. For example, the amount of $P_2O_5$ in the glass compositions may be greater than about 0.4 mol. %, greater than about 1 mol. %, greater than about 3 mol. %, or even greater than about 3.5 mol. %. In some embodiments, the glass compositions may have greater than or equal to 0.1 mol. % $P_2O_5$, greater than or equal to 0.4 mol. % $P_2O_5$, greater than or equal to 1 mol. % $P_2O_5$, greater than or equal to 3 mol. % $P_2O_5$, or even greater than or equal to 3.5 mol. % $P_2O_5$. In some embodiments, the glass compositions may include less than about 20 mol. % $P_2O_5$, less than about 10 mol. % $P_2O_5$, less than about 8 mol. % $P_2O_5$, less than about 6 mol. % $P_2O_5$, or even less than about 5.5 mol. % $P_2O_5$. In some embodiments, the glass compositions may have less than or equal to 20 mol. % $P_2O_5$, less than or equal to 10 mol. % $P_2O_5$, less than or equal to 8 mol. % $P_2O_5$, less than or equal to 6 mol. % $P_2O_5$, or even less than or equal to 5.5 mol. % $P_2O_5$. For example, in some embodiments the glass compositions may include greater than or equal to 0.1 mol. % and less than or equal to 20 mol. % $P_2O_5$, greater than or equal to 0.4 mol. % and less than or equal to 10 mol. % $P_2O_5$, greater than or equal to 1 mol. % and less than or equal to 8 mol. % $P_2O_5$, greater than or equal to 3 mol. % and less than or equal to 6 mol. % $P_2O_5$, or even greater than or equal to 3.5 mol. % and less than or equal to 5.5 mol. % $P_2O_5$. Accordingly, it should be understood that $P_2O_5$ need not be present in the glass compositions. However, when $P_2O_5$ is included in the glass compositions, the amount of $P_2O_5$ in the glass compositions is generally less than about 20 mol. %.

Boron oxide ($B_2O_3$) is a flux which may be added to glass compositions to reduce the viscosity of the glass at a given temperature (e.g., the temperature corresponding to the viscosity of 200 poise, at which glass is melted and which is usually the highest temperature in the glass melting furnace.) thereby improving the quality and formability of the glass. The presence of $B_2O_3$ may also improve damage resistance of the glass made from the glass composition. However, it has been found that additions of $B_2O_3$ significantly decrease the diffusivity of sodium and potassium ions in the glass compositions, which, in turn, adversely impacts the ion exchange performance of the resultant glass. In particular, it has been found that additions of $B_2O_3$ may increase the time required to achieve a given depth of layer in the glass relative to glass compositions which are boron free. The addition of $B_2O_3$ may also increase the temperature at which ion exchange is conducted in order to achieve an ion exchange rate necessary to reach a target depth of layer in the glass in a given duration of time.

The effect of $B_2O_3$ on ion exchange performance of the glass may be compensated for by adding greater amounts of $Li_2O$ and $Al_2O_3$ to the glass composition, which may compensate for the presence of $B_2O_3$ in the glass composition. For example, it has been determined that the impact of $B_2O_3$ on the ion exchange performance of a glass can be mitigated by controlling the ratio of the amount of $B_2O_3$ to the sum of the amounts of $Li_2O$ and $Al_2O_3$ in the glass composition. In particular, it has been determined that when the sum of ($Li_2O$ (mol. %)+$Al_2O_3$ (mol. %)) is greater than two times the amount of $B_2O_3$ (mol. %) in the glass composition, the diffusivities of alkali oxides in the resultant glass are not diminished and, as such, the ion exchange performance of the glass is maintained. Accordingly, in some embodiments, the ratio of ($Li_2O$ (mol. %)+$Al_2O_3$ (mol. %))/($B_2O_3$ (mol. %)) in the glass composition is greater than or equal to 2. At ratios of ($Li_2O$ (mol. %)+$Al_2O_3$ (mol. %))/($B_2O_3$ (mol. %)) in the glass composition less than 2, the diffusivities of the alkali oxides in the glass composition decrease and the ion exchange performance also decreases.

In the embodiments described herein, the amount of $B_2O_3$ in the glass compositions may be from about 0.1 mol. % to about 20 mol. % and all ranges and subranges therebetween. For example, the amount of $B_2O_3$ in the glass compositions may be greater than about 0.1 mol. %, greater than about 3 mol. %, or even greater than about 4 mol. %. In some embodiments, the glass compositions may have greater than or equal to 0.1 mol. % $B_2O_3$, greater than or equal to 3 mol. % $B_2O_3$, or even greater than or equal to 4 mol. % $B_2O_3$. In some embodiments, the glass compositions include less than about 20 mol. % $B_2O_3$, less than about 15 mol. % $B_2O_3$, less than about 10 mol. % $B_2O_3$, or even less than about 7 mol. % $B_2O_3$. In some embodiments, the glass compositions may include less than or equal to 20 mol. % $B_2O_3$, less than or equal to 15 mol. % $B_2O_3$, less than or equal to 10 mol. % $B_2O_3$, or even less than or equal to 7 mol. % $B_2O_3$. For example, in some embodiments, the glass compositions may include greater than or equal to 0.1 mol. % and less than or equal to 20 mol. % $B_2O_3$, greater than or equal to 3 mol. % and less than or equal to 15 mol. % $B_2O_3$, greater than or equal to 4 mol. % and less than or equal to 10 mol. % $B_2O_3$, or even greater than or equal to 4 mol. % and less than or equal to 7 mol. % $B_2O_3$. Accordingly, it should be understood that $B_2O_3$ need not be present in the glass compositions. However, when $B_2O_3$ is included in the glass compositions, the amount of $B_2O_3$ in the glass composition is generally less than about 20 mol. %.

Alkaline earth oxides may be present in the glass compositions to improve the meltability of the glass batch materials and increase the chemical durability of the resultant glass. In particular, the presence of small amounts of alkaline earth oxides may work to increase the liquidus viscosity of the glass composition. However, too much alkaline earth oxide in the glass composition cause crystallization of aluminosilicates and, therefore, reduce the liquidus viscosity of the glass compositions. The presence of alkaline earth oxides may also impact the ion exchange performance of the resultant glass. For example, in the glass compositions described herein, the total amount (in mol. %) of alkaline earth oxides (i.e., RO (mol. %)) present in the glass compositions is generally less than the total amount in mol. % of alkali oxides present in the glass compositions (i.e., $R_2O$ (mol. %)) in order to improve the ion exchange-ability of the glass. In the embodiments described herein, the glass compositions generally include from about 0 mol. % to about 5 mol. % alkaline earth oxides and all ranges and subranges therebetween. In some of these embodiments, the amount of alkaline earth oxides in the glass composition may be from about 0 mol. % to about 3 mol. % or even from about 0 mol. % to about 2 mol. %.

The alkaline earth oxides in the glass composition may include BeO, MgO, CaO, SrO, BaO, or combinations thereof. In some embodiments, the glass composition may be free or substantially free of BaO. In some embodiments, the alkaline earth oxides may include BeO, MgO, CaO, SrO, or combinations thereof. For example, in the embodiments described herein the alkaline earth oxides may include MgO. In embodiments, the glass compositions may include greater than or equal to about 0 mol. % and less than or equal to about 5 mol. % MgO and all ranges and subranges therebetween. In some embodiments, the glass compositions may include greater than 0 mol. % MgO. In some embodiments, glass compositions may include greater than 0 mol. % and less than or equal to about 5 mol. % MgO, greater than 0 mol. % and less than or equal to 3 mol. % MgO, or even greater than 0 mol. % and less than or equal to 0.2 mol. % MgO. Accordingly, it should be understood that MgO need not be present in the glass compositions. However, when MgO is included in the glass compositions, the amount of MgO in the glass compositions is generally less than about 5 mol. %.

In some embodiments, the alkaline earth oxides may further optionally include CaO. The presence of CaO may increase the liquidus viscosity of the glass compositions. However, too much CaO in the glass composition may decrease the rate of ion exchange in the resultant glass. In embodiments, CaO may be present in the glass composition in an amount from about 0 mol. % to about 4 mol. % and all ranges and subranges therebetween. For example, the amount of CaO present in the glass composition may be less than or equal to 4 mol. %, less than or equal to 2 mol. %, or even less than or equal to 1 mol. %. In some embodiments, the glass composition may include greater than 0 mol. % CaO. In some of these embodiments, the glass composition may include greater than 0 mol. % and less than or equal to about 4 mol. % CaO. For example, the glass composition may include greater than 0 mol. % and less than or equal to about 2 mol. % CaO or even greater than 0 mol. % and less than or equal to about 1 mol. % CaO. Accordingly, it should be understood that CaO need not be present in the glass compositions. However, when CaO is included in the glass compositions, the amount of CaO in the glass compositions is generally less than about 4 mol. %.

In some embodiments, the alkaline earth oxides may further optionally include SrO. The presence of SrO may act to increase the liquidus viscosity of the glass composition, However, too much SrO in the glass composition may decrease the rate of ion exchange in the resultant glass. In embodiments, SrO may be present in the glass composition in an amount from about 0 mol. % to less than or equal to 4 mol. % and all ranges and subranges therebetween. For example, the amount of SrO present in the glass composition may be less than or equal to 4 mol. %, less than or equal to 2 mol. %, or even less than or equal to 1 mol. %. In some embodiments, the glass composition may include greater than 0 mol. % SrO. In some of these embodiments, the glass composition may include greater than 0 mol. % and less than or equal to about 4 mol. % SrO. For example, the glass composition may include greater than 0 mol. % and less than or equal to about 2 mol. % SrO or even greater than 0 mol. % and less than or equal to about 1 mol. % SrO. Accordingly, it should be understood that SrO need not be present in the glass compositions. However, when SrO is included in the glass compositions, the amount of SrO in the glass compositions is generally less than about 4 mol. %.

In addition to the $SiO_2$, $Al_2O_3$, $P_2O_5$, $B_2O_3$, alkali oxides, and alkaline earth oxides, the glass compositions described herein may optionally further include one or more fining agents such as, for example, $SnO_2$, $As_2O_3$, and/or (from NaCl or the like). The fining agents may be included in the glass composition to minimize or eliminate bubbles in the glass composition during formation. However, the fining agents generally have low solubility in the glass composition. Thus, if the amount of fining agents in the glass composition is too great, devitrification of the fining agents may occur during fusion forming. When a fining agent is present in the glass composition, the fining agent may be present in an amount less than or equal to 0.35 mol. %, less than or equal to 0.2 mol. %, or even less than or equal to 0.1 mol. %. For example, in some embodiments the glass composition may include $SnO_2$ as a fining agent. In these embodiments, the glass compositions may include greater than or equal to 0 mol. % and less than or equal to 0.35 mol. % $SnO_2$, greater than 0 mol. % and less than or equal to about 0.2 mol. % $SnO_2$, an amount greater than 0 mol. % and less than or equal to 0.1 mol. % $SnO_2$, or even an amount greater than or equal to about 0.01 mol. % and less than or equal to about 0.05 mol. % $SnO_2$. Accordingly, it should be understood that $SnO_2$ or other fining agents need not be present in the glass compositions. However, when $SnO_2$ or other fining agents are included in the glass compositions, the total amount of $SnO_2$ and other fining agents in the glass compositions is generally less than about 0.35 mol. %.

Moreover, the glass compositions described herein may comprise one or more additional metal oxides to further improve the chemical durability of the resultant glass. For example, the glass composition may further optionally include transition metal oxides such as ZnO, $TiO_2$, $ZrO_2$, or combinations of these. Each of these metal oxides may further improve the resistance of the glass to chemical attack. However, these additional metal oxides are not very soluble in the glass compositions and tend to crystallize, resulting in devitrification during fusion forming. In these embodiments, the additional metal oxides may be present in an amount which is greater than or equal to about 0 mol. % and less than or equal to about 5 mol. % and all ranges and subranges therebetween. For example, when the additional metal oxide is ZnO, the ZnO may be present in an amount greater than or equal to 0 mol. % and less than or equal to about 5 mol. %, greater than or equal to 0 mol. % and less than or equal to 3 mol. %, or even greater than or equal to 0 mol. % and less than or equal to 2 mol. %. In some embodiments, when the additional metal oxide is $ZrO_2$ or $TiO_2$, the $ZrO_2$ or $TiO_2$ may be present in an amount less than or equal to about 1 mol. %. Accordingly, it should be understood that these additional metal oxides need not be present in the glass composition. However, when ZnO, $ZrO_2$, or $TiO_2$ are included in the glass composition, the total amount of the ZnO, $ZrO_2$, and $TiO_2$ in the glass composition is generally less than about 5 mol. %.

In some embodiments, the glass compositions may include one or more rare earth metal oxides. Rare earth metals refer to the metals listed in the Lanthanide Series of the IUPAC Periodic Table plus yttrium and scandium. The presence of rare earth metal oxides in the glass composition may increase the modulus, stiffness, or modulus and stiffness of the resultant glass. Rare earth metal oxides may also help to increase the liquidus viscosity of the glass composition. Additionally, certain rare earth metal oxides may add color to the glass. If no color is required or desired, then the glass composition may include lanthanum oxide ($La_2O_3$), yttrium oxide ($Y_2O_3$), gadolinium oxide ($Gd_2O_3$), ytterbium oxide ($Yb_2O_3$), lutelium oxide ($Lu_2O_3$), or combinations of these. For colorless glasses, the rare earth metal oxides may include $Ce_2O_3$, $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, or combinations of these. In embodiments, the glass compositions may include a total amount of rare earth metal oxides of from 0 mol. % to 4 mol. % and all ranges and subranges therebetween. For example, the glass compositions may include greater than 0 mol. % and less than or equal to 4 mol. % rare earth metal oxides, greater than 0 mol. % and less than or equal to 2 mol. % rare earth metal oxides, greater than 0 mol. % and less than or equal to 1.5 mol. % rare earth metal oxides, greater than 0 mol. % and less than or equal to 1 mol. % rare earth metal oxides, greater than 0 mol % and less than or equal to 0.5 mol % rare earth metal oxides, less than 4 mol. % rare earth metal oxides, less than 3 mol. % rare earth metal oxides, less than 2 mol. % rare earth metal oxides, less than 1 mol. % rare earth metal oxides, or less than 0.5 mol % rare earth metal oxides. In some embodiments, the rare earth metal oxide may include $La_2O_3$. For example, in some embodiments, the glass compositions may include greater than 0 mol. % and less than or equal to 4 mol. % $La_2O_3$. Accordingly, it should be understood that rare earth metal oxides need not be present in the glass compositions. However, when rare earth metal oxides are included in the glass compositions, the total amount of rare earth metal oxides in the glass compositions is generally less than about 4 mol. %.

The glass compositions may include less than 0.05 mol. % tramp compounds, such as manganese compounds, cerium compounds, hafnium compounds, or other compounds, that may make it into the glass composition as impurities in the $SiO_2$, $Al_2O_3$, $Li_2O$, $P_2O_5$, $B_2O_3$, alkali metal oxides, alkaline metal oxides, other metal oxide, or other intentionally included constituents of the glass composition. Tramp compounds may also enter the glass composition through contact with processing equipment, such as refractory components of a fusion downdraw forming process, or the like.

As discussed below, the glass compositions described herein can be chemically strengthened through ion exchange to impart a compressive stress at the surface of a glass article. However, during the ion exchange process, the compressive stress formed near the glass surface may decrease as a result of a process known as stress relaxation, which is governed by the viscosity of the glass wherein the lower the viscosity of the glass, the faster the stresses relax and the less efficient the process of chemical strengthening. In some embodiments, the composition of the glass can be controlled to minimize the effect of stress relaxation. The glasses can be characterized by a quantity A which is an estimate of the logarithm of viscosity (in Poises) at a temperature equal to 400° C., which is close to most typical temperatures for ion exchange, wherein:

$$A=13.2+P*[(1/673-1(A.P.+273))]$$

wherein $P=0.6/[(1/(A.P.+273))-(1/(T_{12}+273))]$,
wherein A.P. is the annealing point in ° C., and
wherein $T_{12}$ is the temperature corresponding to when the glass has a viscosity of $10^{12}$ Poises.

In some embodiments, when A is greater than or equal to 17, greater than or equal to 18, greater than or equal to 19, or greater than or equal to 20, stress relaxation is minimized.

The glass compositions described herein are formed by mixing a batch of glass raw materials (e.g., powders of spodumene, sand, aluminum oxide, aluminum metaphosphate, boric acid, alkali carbonates, alkali nitrates, alkaline earth carbonates, alkaline earth oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass article may be shaped into a stock form, such as a sheet, ribbon, tube or the like, and subsequently reheated and formed into the desired final form.

The glass compositions described herein may be shaped into glass articles having various forms such as, for example, sheets, ribbons, tubes, or the like. However, given the mechanical durability, the glass compositions described herein are particularly well suited for use in the formation of cover glass for electronic devices, such as portable electronic devices. Moreover, the ability to chemically strengthen the glass compositions through ion exchange can be utilized to further improve the mechanical durability of the glass sheets and articles made from the glass compositions disclosed herein. Accordingly, it should be understood that, in at least one embodiment, the glass compositions are incorporated in an electronic device to improve the mechanical durability of the electronic device.

The fusion downdraw process is one technique for shaping the molten glass compositions described herein into glass sheets and glass ribbons during solidification of the glass compositions. The fusion downdraw process produces glass sheets and ribbons with relatively low amounts of defects and with surfaces having superior flatness, compared to ribbons made using other glass ribbon forming processes, such as the float and slot-draw processes. As a result, fusion downdraw processes are widely employed for the production of glass substrates used in the manufacture of LED and LCD displays and other substrates that require superior flatness. In a typical fusion downdraw process, the glass composition is prepared and melted, and the molten glass composition is fed into a forming body (also referred to as an isopipe), which includes forming surfaces that converge at a root. The molten glass flows evenly over the forming surfaces of the forming body and forms a ribbon of flat glass with pristine surfaces. The ribbon of flat glass is drawn away from the root of the forming body at a rate greater than the rate at which the glass flows downward along the forming surfaces of the forming body under gravity. The viscosities of the glass compositions generally decrease exponentially with increasing temperature. Therefore, the glass compositions may have a liquidus temperature as low as possible to increase the viscosity of the glass composition at the liquidus temperature (i.e., the liquidus viscosity). This ensures that the rate at which the glass ribbon is drawn away from the root is greater than the rate at which the glass composition flows down the forming surfaces of the forming body. If the liquidus temperature of the glass composition is too high, then the liquidus viscosity becomes too low to effectively downdraw the glass composition. Decreasing the temperature below the liquidus temperature to reduce the viscosity of the glass composition causes devitrification of the glass composition during fusion forming process. Devitrification of constituents of the glass composition during fusion forming results in flaws and/or imperfections in the glass ribbon, in particular in the surface of the glass ribbon. Additionally, crystallization of constituents also diminishes the formability of the glass.

As previously described, the glass compositions disclosed herein have a liquidus temperature that is low enough so that the liquidus viscosity of the glass composition is sufficiently high to enable the glass composition to be formed by a fusion downdraw forming process. For example, in some embodiments, the glass compositions may have a liquidus temperature of less than or equal to 1300° C. In other embodiments, the glass compositions may have liquidus temperatures of less than or equal to 1250° C., less than or equal to 1200° C., or even less than or equal to 1150° C. In some embodiments, the glass compositions may have a liquidus temperature of greater than or equal to 1100° C. and less than or equal to 1300° C., greater than or equal to 1100° C. and less than or equal to 1250° C., greater than or equal to 1150° C. and less than or equal to 1300° C., or greater than or equal to 1150° C. and less than or equal to 1250° C. In embodiments, the glass compositions have a liquidus viscosity sufficient to enable the glass composition to be formed using a fusion downdraw forming process. For example, in some embodiments, the glass compositions may have a high liquidus viscosity of at least 20 kilopoise (kP) (20,000 poise (P) or 2000 Pascal seconds (Pa-s), where 1 kP is equal to 100 Pascal seconds (Pa-s). In other embodiments, the glass compositions may have a liquidus viscosity of at least 50 kP, at least 100 kP, at least 200 kP, at least 300 kP, or even at least 500 kP. In some embodiments, the glass compositions may have a liquidus viscosity of greater than or equal to 20 kP, greater than or equal to 50 kP, greater than or equal to 100 kP, greater than or equal to 200 kP, greater than or equal to 300 kP, greater than or equal to 500 kP, or even greater than or equal to 1000 kP. In other embodiments, the glass compositions may have a liquidus viscosity less than about 1200 kP, or even less than 1000 kP. In still other embodiments, the glass composition may have a liquidus viscosity of greater than or equal to 20 kP and less than or equal to 1000 kP. For example, the glass compositions may have a liquidus viscosity of greater than or equal to 50 kP and less than or equal to 1000 kP, greater than or equal to 100 kP and less than or equal to 1000 kP, or even greater than or equal to 500 kP and less than or equal to 1000 kP.

As discussed, the glass compositions disclosed herein have liquidus viscosities sufficiently high to enable forming, such as forming into glass ribbons and/or sheets, using fusion downdraw forming processes. However, the glass compositions may also be made using other known glass forming methods, such as float methods or slot draw processes, for example. In float methods, the molten glass composition is floated on top of a bath of a molten metal bath, such as a molten tin bath. The molten glass composition cools as it passes along the surface of the molten metal until the glass is removed from the surface of the bath as a glass ribbon formed from the glass composition. Other glass formation processes are also contemplated.

Glass articles and glass sheets made from the glass compositions described herein may be chemically strengthened by ion exchange. In the ion exchange strengthening process, ions in the surface layer of the glass made from the glass compositions are replaced by—or exchanged with—larger ions having the same valence or oxidation state. In embodiments, ions in the surface layer of the glass composition and the larger ions are monovalent alkali metal cations, such as $Li^+$, $Na^+$, $Rb^+$, and $Cs^+$. Alternatively, monovalent cations in the surface layer may be replaced with monovalent cations other than alkali metal cations, such as $Ag^+$ or the like.

Commercial-scale ion exchange processes are typically carried out by immersing a glass article or glass sheet made from the glass composition in a molten salt bath containing the larger ions to be exchanged with the smaller ions in the glass composition. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the glass composition and the desired depth of layer and compressive stress of the glass composition that result from the ion exchange strengthening process. By way of example, ion exchange of alkali metal-containing glasses may be achieved by immersion in at least one molten bath containing a salt such as, but not limited to, nitrates, sulfates, and chlorides, of the larger alkali metal ion. The temperature of the molten salt bath typically is in a range from about 350 degrees Celsius (° C.) up to about 450° C., while immersion times range from about 0.1 hours up to about 36 hours. However, temperatures and immersion times different from those described above may also be used.

Ion exchange strengthening creates compressive stress in the outer regions of the glass made from the glass composition by replacing a plurality of first alkali metal ions in the outer region of the glass with a plurality of second metal ions from the molten salt bath so that the outer region comprises the plurality of the second metal ions. Each of the first alkali metal ions has a first ionic radius and each of the second metal ions has a second ionic radius. The second ionic radius is greater than the first ionic radius, and the presence of the larger second metal ions in the outer region creates the compressive stress in the outer region. The first alkali metal ions may be ions of lithium, sodium, potassium, or rubidium. The second metal ions may be ions of at least one of sodium, potassium, rubidium, and cesium. Generally, the second metal ion is different than the first alkali metal ion and has an ionic radius greater than the ionic radius of the first alkali metal ion.

Compressive stress (CS), depth of compression (DOC), and depth of layer (DOL) of a particular ion resulting from ion exchange may be measured using known techniques. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient."

As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of layer potassium ions (Potassium DOL or K DOL) indicates a change in the magnitude of the compressive stress (but not the change in stress from compressive to tensile); the exchange depth of potassium ions in such glass articles is measured by FSM.

The DOC values disclosed herein, specifically the DOC values of at least 10% of the thickness of the glass, and more preferably greater than or equal to 20% of the thickness of the glass, reflect DOC values computed using the SCALP technique. For clarity, the DOC value represents the thickness of at least one compression stress layer, which means that the strengthened glass article or sheet may have one compression layer with a DOC of at least 20% of the thickness of the glass or two compression layers with each having a DOC of at least 20% of the thickness of the glass. The disclosed DOC values are not a combination, for example, a sum or average, of the two compressive stress layers.

As noted above, the presence of alkali oxides in the glass composition facilitates chemically strengthening the resultant glass by ion exchange. Specifically, alkali ions, such as lithium ions, sodium ions, potassium ions, and the like, are sufficiently mobile in the glass composition to facilitate ion exchange. In some embodiments, the glass may be ion exchanged by introducing the glass, such as a glass article or glass sheet made from the glass composition for example, into an ion exchange bath (e.g., immersing the glass in the ion exchange bath) comprising sodium nitrate ($NaNO_3$), potassium nitrate ($KNO_3$), or both. In embodiments, the ion exchange bath may include from 1 weight percent (wt. %) to 100 wt. % $NaNO_3$, based on the total weight of the ion exchange bath. For example, the ion exchange bath may include from 1 wt. % to 99 wt. %, from 1 wt. % to 80 wt. %, from 1 wt. % to 20 wt. %, from 20 wt. % to 100 wt. %, from 20 wt. % to 99 wt. %, from 20 wt. % to 80 wt. %, from 80 wt. % to 100 wt. %, or from 80 wt. % to 99 wt. % $NaNO_3$, based on the total weight of the ion exchange bath. The ion exchange bath may also include an amount of $KNO_3$ sufficient to increase the compressive stress at the surface of the glass. For example, in embodiments, the ion exchange bath may include from 0 wt. % to 99 wt. % $KNO_3$, based on the total weight of the ion exchange bath. In some embodiments, the ion exchange bath may include from 0 wt. % to 98 wt. %, from 0 wt. % to 80 wt. %, from 0 wt. % to 20 wt. %, from 20 wt. % to 99 wt. %, from 20 wt. % to 98 wt. %, from 20 wt. % to 80 wt. %, from 80 wt. % to 99 wt. %, or from 80 wt. % to 98 wt. % $KNO_3$, based on the total weight of the ion exchange bath. The ion exchange bath may optionally include 0.1 wt. % to 2 wt. % silicic acid $H_4SiO_4$.

The ion exchange strengthening of the glass made from the glass composition may be conducted at an ion exchange temperature and for an immersion time sufficient to provide a target stress profile within the glass. For example, in embodiments, the ion exchange bath may be maintained at a temperature of from 350° C. to 450° C. In other embodiments, the ion exchange bath may be maintained at a temperature of from 365° C. to 440° C. In some embodiments, the ion exchange may be conducted for an immersion time of from 0.1 hours to 36 hours. In other embodiments, the ion exchange may be conducted for an immersion time of from 0.1 hours to 30 hours, from 0.1 hours to 20 hours, from 0.1 hours to 10 hours, from 1 hour to 36 hours, from 1 hour to 30 hours, from 1 hour to 20 hours, from 1 hour to 10 hours, or from 10 hours to 20 hours. The immersion time of the ion exchange may depend on the thickness of the glass being ion exchanged. The immersion time of ion exchange may also depend on the glass composition as previously described in this disclosure. In some embodiments, for a flat glass sheet made from the glass composition and having a thickness of from 0.5 millimeters (mm) to 1 mm, the ion exchange may be conducted for an immersion time of greater than or equal to 1 hour and less than or equal to 10 hours.

In some embodiments, the glass composition may enable the glass to be ion exchanged until the sodium ions reach the center of the thickness of the glass. By ion exchanging the glass composition until the sodium ions meet in the center of the thickness of the glass, a sodium ion concentration gradient through the thickness of the glass may be generated, resulting in a parabolic stress profile through the thickness of the glass. Referring to FIG. 1, the stress profiles of two example glasses made from the glass compositions are illustrated as a function of the thickness through the glass. In FIG. 1, negative stress indicates compressive stress and positive stress indicates tensile stress (i.e., central tension (CT)). The DOC is the point at which the stress in the glass transitions from compressive stress (i.e., negative stress of FIG. 1) to central tension (i.e., positive stress of FIG. 1). As shown in FIG. 1, the gradient of sodium ions penetrating into the central tension region (i.e., the region from about 1.5 mm to about 6 mm in FIG. 1) makes the stress profile curved in the central tension region. Because the stress profile is curved in the central tension region, the total stored tension in the central tension region of the glass is less. If the central tension in the glass becomes too great, the glass may become frangible. Thus, by ion exchanging the glass to produce a parabolic stress profile that reduces the central tension in the glass, a greater DOC can be achieved without causing the glass to become frangible. As used herein, the terms "frangible behavior" and "frangibility" refer to those modes of violent or energetic fragmentation of the strengthened glass absent any external restraints, such as coatings, adhesive layers, or the like. While coatings, adhesive layers, and the like may be used in conjunction with the strengthened glass made from the glass compositions described herein, such external restraints are not used in determining the frangibility or frangible behavior of the glass.

In some embodiments, the parabolic stress profile may enable the central tension in the glass composition to be less than 120 megaPascals (MPa), or even less than 100 MPa. In some embodiments, the central tension of the glass composition may be greater than or equal to 50 MPa and less than 120 MPa, or even greater than or equal to 70 MPa and less than or equal to 100 MPa. In some embodiments, 0.8 mm thick samples of the glass made from the glass compositions disclosed herein are capable of being ion exchanged to a parabolic profile in less than 8 hours at 430° C.

In embodiments, after ion exchanging of the glass article or glass sheet made from the glass composition to produce a parabolic stress profile, the DOC in the glass may be up to 15% of the thickness of the glass. For example, in some embodiments, after ion exchange of the glass to produce a parabolic stress profile, the DOC may be up to 18% of the thickness of the glass, up to 20% of the thickness of the glass, up to 22% of the thickness of the glass, or even up to 25% of the thickness of the glass. In some embodiments, after ion exchange, the glass composition may have a DOC of from 5% to 25% of the thickness of the glass composition. For example, after ion exchange of the glass made from the glass composition, the glass may have a DOC of from 5% to 18%, from 5% to 20%, from 5% to 20%, from 5% to 22%, from 10% to 15%, from 10% to 18%, from 10% to 20%, from 10% to 22%, from 10% to 25%, from 15% to 18%, from 15% to 20%, from 15% to 22%, from 15% to 25%, from 18% to 20%, or from 18% to 22% of the thickness of the glass. In one example, a sheet of the glass made from the glass compositions and having a thickness of 0.8 mm may have a DOC of up to about 120 µm, or up to about 145 µm, or even up to about 160 µm. In another example, a sheet of glass made from the glass compositions and having a thickness of 1 mm may have a DOC of up to about 150 µm, or up to about 180 µm, or even up to about 200 µm. Ion exchanging the glass to attain a parabolic stress profile may enable the glass to have a DOC in a range of from 100 µm to 200 µm for glass having thicknesses of from 0.5 mm to 1 mm. Typical conventional alkali aluminosilicate glasses have a DOC after ion exchange of from 40 µm to 50 µm. Therefore, the glass compositions disclosed herein may enable ion exchange of glass made from the glass compositions to produce a parabolic stress profile in the glass, which may result in a substantially greater DOC in the glass.

The glass compositions described herein enable the sodium ions to migrate to the center of the glass during ion exchange. However, potassium ions, when present in the ion exchange bath, may not migrate as far into the glass made from the glass compositions compared to the sodium ions due to the larger size of the potassium ions compared to the sodium ions. In embodiments in which potassium ions are included in the ion exchange bath, the potassium ions penetrate into the glass (K DOL) to a depth of from 5 µm to 25 µm, from 5 µm to 15 µm, or even from 8 µm to 12 µm.

In some embodiments, after ion exchange, the glass made from the glass compositions may have a compressive stress sufficient to provide damage resistance to the glass. For example, in some embodiments, after ion exchange, the glass may have a compressive stress at the surface of the glass of greater than or equal to 400 MPa, greater than or equal to 500 MPa, or even greater than or equal to 600 MPa.

In some embodiments, a second ion exchange step may be conducted to further increase the compressive stress in the outer regions of the glass formed from the glass compositions. Without being bound by theory, the second ion exchange step is considered to be a rapid ion exchange step that yields a "spike" of compressive stress near the surface of the glass. In one or more embodiments, the second ion exchange step may be conducted for a time of 30 minutes or less, or for a time of 15 minutes or less, or optionally may be conducted in a range of about 10 to about 15 minutes. The composition of the second ion exchange bath may be different than the first ion exchange bath, such as when the second ion exchange step is directed to delivering a different ion to the glass than the first ion exchange step. In some embodiments, the second ion exchange bath may comprise a potassium salt, such as potassium nitrate, potassium sulfate, potassium chloride, other potassium salt, or combinations of these. In one or more embodiments, the second ion exchange bath may comprise at least about 80% by weight potassium salt. In a specific embodiment, the second ion exchange bath may comprise from about 95% to about 99.5% by weight potassium salt. While it is possible that the second ion exchange bath only comprises a potassium salt, the second ion exchange bath may, in some embodiments, comprise 0-2% by weight, or about 0.5-1.5% by weight sodium salt, for example, $NaNO_3$. In an exemplary embodiment, the potassium salt is $KNO_3$. In further embodiments, the temperature of the second ion exchange step may be 390° C. or greater. If the compressive stress in the ion exchanged glass following the first ion exchange is not sufficient, then the second ion exchange step may be conducted to "spike" the outer surface of the glass with potassium ions to increase the compressive stress at the surface of the glass.

The glasses made from the glass compositions described herein may generally have a strain point greater than or equal to about 500° C. and less than or equal to about 650° C. The glasses made from the glass compositions disclosed herein may also have an anneal point greater than or equal to about 550° C. and less than or equal to about 725° C. and a softening point greater than or equal to about 775° C. and less than or equal to about 960° C.

In the embodiments described herein the glass made from the glass composition may have a CTE of less than about $75 \times 10^{-7}$ $K^{-1}$ or even less than about $60 \times 10^{-7}$ $K^{-1}$. These lower CTE values improve the survivability of the glass to thermal cycling or thermal stress conditions relative to glass compositions with higher CTEs.

The glass articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 2A and 2B. Specifically, FIGS. 2A and 2B show a consumer electronic device 300 including a housing 302 having front 304, back 306, and side surfaces 308; electrical components (not shown) that are at least partially inside or entirely within the housing and including at least a controller, a memory, and a display 310 at or adjacent to the front surface of the housing; and a cover substrate 312 at or over the front surface of the housing such that it is over the display. In some embodiments, at least one of the cover substrate 312 or a portion of housing 302 may include any of the glass articles disclosed herein.

EXAMPLES

The embodiments of the glass compositions described herein will be further clarified by the following examples.

Example 1

103 exemplary glass compositions (compositions 1-103) were prepared. The specific compositions of each exemplary glass composition are reported below in Table 1. The constituents of the glass compositions were melted in platinum crucibles between 1500° C. and 1600° C. for 5 to 6 hours, and then re-melted at a higher temperature between 1600° C. and 1650° C. for 5 to 6 hours to improve homogeneity and melt quality. The liquidus temperature and liquidus viscosity of the glass compositions of Example 1 were measured. The glasses were then cast onto a steel plate and annealed for 1 hour near the anneal temperatures given in Table I. Multiple samples of each glass composition were cut and polished for property measurements and further ion exchange experiments. All of the samples were 0.8 mm in thickness. Each of the samples were tested for coefficient of thermal expansion (CTE), density, toughness, and Young's modulus. The density values recited in this disclosure refer to a value as measured by the buoyancy method of ASTM C693-93 (2013). The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." In some embodiments, the Young's modulus is greater than or equal to 70 GPa or greater than or equal to 80 GPa. The results for all of the glass compositions are reported below in Table 1. The fracture toughness value (Kw) recited in this disclosure refers to a value as measured by chevron notched short bar (CNSB) method disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). In some embodiments, the fracture toughness is greater than or equal to about 0.7 MPa·m$^{1/2}$ or greater than or equal to about 0.7 MPa·m$^{1/2}$.

TABLE 1

Glass Compositions and Properties of Example 1

| Composition ID | \multicolumn{7}{c}{Composition Mole %} |
|---|---|---|---|---|---|---|---|
| | 1 | 2 | 3 | 4 | 5 | 6 | 7 |
| SiO$_2$ | 65.042 | 73.659 | 65.212 | 67.242 | 63.517 | 63.433 | 61.511 |
| Al$_2$O$_3$ | 13.457 | 12.874 | 13.933 | 11.921 | 14.877 | 14.848 | 15.853 |
| B$_2$O$_3$ | 6.666 | 0.000 | 7.738 | 5.736 | 7.630 | 7.610 | 7.545 |
| P$_2$O$_5$ | 5.231 | — | 3.956 | 5.911 | 3.956 | 3.976 | 3.983 |
| Li$_2$O | 8.065 | 6.012 | 7.982 | 8.018 | 7.817 | 8.831 | 9.794 |
| Na$_2$O | 0.823 | 1.926 | 0.962 | 0.960 | 1.061 | 1.062 | 1.059 |
| K$_2$O | 0.044 | 0.034 | 0.041 | 0.042 | 0.029 | 0.032 | 0.037 |
| MgO | 0.032 | 2.001 | 0.024 | 0.020 | 0.934 | 0.027 | 0.027 |
| CaO | 0.533 | 1.960 | 0.045 | 0.043 | 0.055 | 0.052 | 0.058 |
| ZnO | 0.000 | 0.000 | 0.000 | 0.000 | 0.000 | 0.000 | 0.000 |
| SnO$_2$ | 0.079 | 0.075 | 0.079 | 0.079 | 0.082 | 0.083 | 0.082 |
| ZrO$_2$ | 0.000 | 0.000 | 0.000 | 0.000 | 0.001 | 0.001 | 0.001 |
| TiO$_2$ | 0.002 | 0.008 | 0.002 | 0.002 | 0.002 | 0.002 | 0.003 |
| HfO$_2$ | 0.000 | 0.000 | 0.000 | 0.000 | 0.006 | 0.006 | 0.006 |
| Fe$_2$O$_3$ | 0.019 | 0.017 | 0.020 | 0.020 | 0.020 | 0.022 | 0.024 |
| MnO$_2$ | 0.000 | — | — | — | 0.008 | 0.009 | 0.010 |
| SrO | 0.000 | — | — | — | — | — | — |
| R$_2$O—Al$_2$O$_3$ | -4.525 | -4.903 | -4.948 | -2.900 | -5.970 | -4.922 | -4.963 |
| R$_2$O+RO—Al$_2$O$_3$ | -3.960 | -0.942 | -4.880 | -2.837 | -4.981 | -4.843 | -4.877 |
| R$_2$O+RO+P$_2$O$_5$—Al$_2$O$_3$ | 1.271 | -0.942 | -0.923 | 3.073 | -1.024 | -0.867 | -0.894 |
| Li$_2$O/R$_2$O | 0.903 | 0.754 | 0.888 | 0.889 | 0.878 | 0.890 | 0.899 |
| Strain (° C.) | 535 | 657 | 539 | 518 | 545 | 539 | 539 |
| Anneal (° C.) | 589 | 708 | 593 | 573 | 597 | 592 | 590 |
| Softening (° C.) | 872 | 953 | 870 | 874 | 860.3 | 854.1 | 839.5 |
| CTE (10$^{-7}$ ° C.$^{-1}$) | 44.2 | 46.1 | 43.3 | 45.2 | 41.6 | 44.6 | 47.2 |
| Density (g/cm$^3$) | 2.284 | 2.512 | 2.29 | 2.273 | 2.307 | 2.302 | 2.313 |
| Liq. T (° C.) | 1230 | 1235 | 1175 | 1250 | 1185 | 1140 | 1165 |
| Liq. Visc. (kP) | 22.3 | 42.2 | 50.3 | 29.4 | 24.6 | 51.3 | 21.9 |
| Fracture Toughness (MPa·m$^{1/2}$) | 0.674 | 0.808 | 0.718 | 0.708 | — | 0.723 | 0.758 |
| Young's Mod. (GPa) | 78.94 | 84.67 | 68.81 | 67.09 | 70.46 | 69.64 | 70.46 |

| Composition ID | \multicolumn{7}{c}{Composition Mole %} |
|---|---|---|---|---|---|---|---|
| | 8 | 9 | 10 | 11 | 12 | 13 | 14 |
| SiO$_2$ | 65.372 | 62.398 | 58.517 | 67.097 | 67.176 | 67.120 | 68.099 |
| Al$_2$O$_3$ | 14.863 | 17.822 | 17.789 | 13.983 | 13.987 | 13.977 | 12.993 |
| B$_2$O$_3$ | 6.299 | 0.000 | 0.000 | 5.856 | 5.853 | 5.824 | 5.844 |
| P$_2$O$_5$ | 3.321 | 1.975 | 5.850 | 2.922 | 2.932 | 2.937 | 2.935 |
| Li$_2$O | 8.837 | 11.678 | 11.696 | 8.910 | 7.851 | 6.953 | 7.911 |
| Na$_2$O | 1.061 | 5.820 | 5.834 | 0.971 | 1.955 | 2.954 | 1.970 |
| K$_2$O | 0.034 | 0.041 | 0.042 | 0.044 | 0.039 | 0.035 | 0.038 |
| MgO | 0.030 | 0.036 | 0.038 | 0.020 | 0.020 | 0.015 | 0.020 |
| CaO | 0.055 | 0.070 | 0.073 | 0.049 | 0.045 | 0.042 | 0.045 |
| ZnO | 0.000 | 0.000 | 0.000 | 0.002 | 0.002 | 0.002 | 0.001 |
| SnO$_2$ | 0.082 | 0.104 | 0.103 | 0.083 | 0.080 | 0.083 | 0.083 |
| ZrO$_2$ | 0.001 | 0.001 | 0.001 | 0.010 | 0.009 | 0.010 | 0.010 |
| TiO$_2$ | 0.003 | 0.003 | 0.003 | 0.006 | 0.008 | 0.010 | 0.008 |
| HfO$_2$ | 0.006 | 0.000 | 0.000 | 0.000 | 0.000 | 0.000 | 0.000 |
| Fe$_2$O$_3$ | 0.023 | 0.029 | 0.029 | 0.023 | 0.021 | 0.019 | 0.020 |
| MnO$_2$ | 0.009 | 0.014 | 0.015 | 0.018 | 0.015 | 0.011 | 0.015 |
| SrO | — | — | — | — | — | — | — |
| R$_2$O—Al$_2$O$_3$ | -4.931 | -0.284 | -0.217 | -4.058 | -4.142 | -4.035 | -3.074 |
| R$_2$O+RO—Al$_2$O$_3$ | -4.846 | -0.178 | -0.107 | -3.988 | -4.075 | -3.976 | -3.008 |
| R$_2$O+RO+P$_2$O$_5$—Al$_2$O$_3$ | -1.525 | 1.796 | 5.744 | -1.066 | -1.143 | -1.039 | -0.073 |
| Li$_2$O/R$_2$O | 0.890 | 0.666 | 0.666 | 0.898 | 0.797 | 0.699 | 0.798 |
| Strain (° C.) | 557 | 613 | 566 | 573 | 563 | 564 | 557 |
| Anneal (° C.) | 610 | 662 | 615 | 627 | 620 | 620 | 613 |
| Softening (° C.) | 877.8 | xtl | 857.2 | 889.5 | 891.1 | 893.3 | 877.9 |
| CTE (10$^{-7}$ ° C.$^{-1}$) | 44.2 | 74 | 75.3 | 44.9 | 46.1 | 47.8 | 47.3 |
| Density (g/cm$^3$) | 2.313 | 2.41 | 2.395 | 2.309 | 2.311 | 2.313 | 2.303 |
| Liq. T (° C.) | 1195 | 1170 | 1160 | 1135 | 1105 | 1075 | 1165 |
| Liq. Visc. (kP) | 27.4 | 35.9 | 26.6 | 120.2 | 240.5 | 455.7 | 92.5 |
| Fracture Toughness (MPa·m$^{1/2}$) | 0.745 | 0.74 | 0.716 | 0.776 | 0.768 | 0.709 | 0.688 |
| Young's Mod. (GPa) | 71.57 | 80.88 | 76.67 | 72.12 | 72.12 | 71.29 | 70.12 |

TABLE 1-continued

Glass Compositions and Properties of Example 1

| Composition ID | Composition Mole % | | | | | | |
|---|---|---|---|---|---|---|---|
| | 15 | 16 | 17 | 18 | 19 | 20 | 21 |
| $SiO_2$ | 67.135 | 67.134 | 67.972 | 68.095 | 67.855 | 68.173 | 67.126 |
| $Al_2O_3$ | 13.987 | 13.956 | 14.968 | 15.010 | 14.939 | 15.031 | 14.002 |
| $B_2O_3$ | 6.796 | 4.878 | 3.924 | 2.694 | 1.856 | 2.724 | 4.877 |
| $P_2O_5$ | 1.957 | 3.886 | 1.955 | 2.931 | 3.893 | 1.963 | 3.959 |
| $Li_2O$ | 7.895 | 7.923 | 8.008 | 8.077 | 8.288 | 7.950 | 7.393 |
| $Na_2O$ | 1.971 | 1.974 | 2.926 | 2.943 | 2.918 | 3.912 | 2.421 |
| $K_2O$ | 0.039 | 0.039 | 0.037 | 0.037 | 0.037 | 0.039 | 0.037 |
| MgO | 0.018 | 0.018 | 0.021 | 0.020 | 0.022 | 0.025 | 0.024 |
| CaO | 0.045 | 0.046 | 0.046 | 0.047 | 0.046 | 0.045 | 0.044 |
| ZnO | 0.001 | 0.002 | 0.001 | 0.002 | 0.002 | 0.002 | 0.000 |
| $SnO_2$ | 0.083 | 0.083 | 0.083 | 0.084 | 0.084 | 0.083 | 0.073 |
| $ZrO_2$ | 0.006 | 0.009 | 0.005 | 0.007 | 0.009 | 0.004 | 0.001 |
| $TiO_2$ | 0.009 | 0.007 | 0.007 | 0.008 | 0.007 | 0.004 | 0.010 |
| $HfO_2$ | 0.000 | 0.000 | 0.000 | 0.000 | 0.000 | 0.000 | 0.000 |
| $Fe_2O_3$ | 0.020 | 0.021 | 0.021 | 0.021 | 0.021 | 0.021 | 0.020 |
| $MnO_2$ | 0.014 | 0.015 | 0.015 | 0.015 | 0.013 | 0.015 | 0.008 |
| SrO | — | — | — | — | — | — | — |
| $R_2O—Al_2O_3$ | -4.082 | -4.018 | -3.997 | -3.953 | -3.695 | -3.131 | -4.151 |
| $R_2O+RO—Al_2O_3$ | -4.018 | -3.952 | -3.928 | -3.885 | -3.626 | -3.059 | -4.084 |
| $R_2O+RO+P_2O_5—Al_2O_3$ | -2.061 | -0.066 | -1.973 | -0.954 | 0.268 | -1.096 | -0.125 |
| $Li_2O/R_2O$ | 0.797 | 0.797 | 0.730 | 0.730 | 0.737 | 0.668 | 0.750 |
| Strain (° C.) | 561 | 564 | 598 | 604 | 610 | 598 | 565 |
| Anneal (° C.) | 616 | 620 | 654 | 660 | 667 | 654 | 621 |
| Softening (° C.) | — | 900.7 | 920.9 | 935.9 | 950.7 | 925.1 | 905.9 |
| CTE ($10^{-7}$ °$C.^{-1}$) | 45.5 | 47 | 49.7 | 49.9 | 50.7 | 54.8 | 48.2 |
| Density (g/cm$^3$) | 2.315 | 2.308 | 2.342 | 2.338 | 2.335 | 2.351 | 2.309 |
| Liq. T (° C.) | 1210 | 1095 | 1250 | 1175 | 1180 | 1170 | 1090 |
| Liq. Visc. (kP) | 28.0 | 407.3 | 25.9 | 123.6 | 162.7 | 116.1 | 478.4 |
| Fracture Toughness (MPa·m$^{1/2}$) | 0.762 | 0.715 | 0.759 | 0.739 | 0.735 | 0.759 | 0.734 |
| Young's Mod. (GPa) | 72.12 | 70.95 | 74.95 | 74.88 | 74.46 | 76.26 | 70.67 |

| Composition ID | Composition Mole % | | | | | | |
|---|---|---|---|---|---|---|---|
| | 22 | 23 | 24 | 25 | 26 | 27 | 28 |
| $SiO_2$ | 67.105 | 65.781 | 66.097 | 65.237 | 67.097 | 67.176 | 65.050 |
| $Al_2O_3$ | 13.976 | 13.717 | 14.974 | 13.586 | 13.971 | 14.006 | 13.353 |
| $B_2O_3$ | 4.920 | 4.802 | 3.903 | 4.743 | 4.890 | 5.815 | 6.893 |
| $P_2O_5$ | 3.957 | 3.873 | 4.943 | 3.850 | 3.966 | 2.978 | 3.195 |
| $Li_2O$ | 6.923 | 6.821 | 6.947 | 7.590 | 7.919 | 7.870 | 8.847 |
| $Na_2O$ | 2.905 | 2.849 | 2.913 | 1.879 | 1.931 | 1.932 | 2.421 |
| $K_2O$ | 0.035 | 0.034 | 0.034 | 0.038 | 0.040 | 0.040 | 0.044 |
| MgO | 0.024 | 1.959 | 0.026 | 2.899 | 0.025 | 0.022 | 0.018 |
| CaO | 0.041 | 0.053 | 0.044 | 0.061 | 0.046 | 0.044 | 0.049 |
| ZnO | 0.000 | 0.000 | 0.000 | 0.000 | 0.000 | 0.000 | 0.002 |
| $SnO_2$ | 0.073 | 0.071 | 0.074 | 0.071 | 0.073 | 0.073 | 0.062 |
| $ZrO_2$ | 0.001 | 0.001 | 0.001 | 0.001 | 0.001 | 0.001 | 0.008 |
| $TiO_2$ | 0.008 | 0.008 | 0.011 | 0.008 | 0.006 | 0.008 | 0.007 |
| $HfO_2$ | 0.000 | 0.000 | 0.000 | 0.000 | 0.000 | 0.000 | 0.000 |
| $Fe_2O_3$ | 0.019 | 0.019 | 0.019 | 0.022 | 0.021 | 0.021 | 0.023 |
| $MnO_2$ | 0.008 | 0.006 | 0.006 | 0.009 | 0.008 | 0.008 | 0.020 |
| SrO | — | — | — | — | — | — | — |
| $R_2O—Al_2O_3$ | -4.113 | -4.013 | -5.080 | -4.079 | -4.081 | -4.165 | -2.041 |
| $R_2O+RO—Al_2O_3$ | -4.048 | -2.001 | -5.010 | -1.119 | -4.010 | -4.099 | -1.972 |
| $R_2O+RO+P_2O_5—Al_2O_3$ | -0.091 | 1.872 | -0.067 | 2.731 | -0.044 | -1.121 | 1.223 |
| $Li_2O/R_2O$ | 0.702 | 0.703 | 0.702 | 0.798 | 0.801 | 0.800 | 0.782 |
| Strain (° C.) | 559 | 555 | 576 | 558 | 566 | 559 | 525 |
| Anneal (° C.) | 617 | 608 | 634 | 609 | 623 | 614 | 578 |
| Softening (° C.) | 904.5 | 875.3 | 921.2 | — | — | — | 839.8 |
| CTE ($10^{-7}$ °$C.^{-1}$) | 48.8 | 49 | 48.8 | 47.3 | 47 | 47.1 | 53.2 |
| Density (g/cm$^3$) | 2.31 | 2.329 | 2.315 | 2.335 | 2.308 | 2.311 | 2.309 |
| Liq. T (° C.) | 1105 | 1070 | 1175 | 1100 | 1100 | 1135 | 1085 |
| Liq. Visc. (kP) | 367.9 | 410.1 | 123.8 | 153.2 | 384.4 | 139.5 | 132.3 |
| Fracture Toughness (MPa·m$^{1/2}$) | 0.725 | 0.749 | 0.724 | — | — | — | 0.771 |
| Young's Mod. (GPa) | 70.67 | 72.33 | 70.95 | 73.22 | 70.88 | 71.29 | 69.84 |

TABLE 1-continued

Glass Compositions and Properties of Example 1

| Composition ID | Composition Mole % | | | | | | |
|---|---|---|---|---|---|---|---|
| | 29 | 30 | 31 | 32 | 33 | 34 | 35 |
| $SiO_2$ | 65.803 | 66.519 | 65.457 | 66.021 | 66.364 | 65.862 | 66.642 |
| $Al_2O_3$ | 13.515 | 13.654 | 13.017 | 13.153 | 13.233 | 13.017 | 13.216 |
| $B_2O_3$ | 6.957 | 6.882 | 6.964 | 7.075 | 7.073 | 7.030 | 6.936 |
| $P_2O_5$ | 3.241 | 3.262 | 3.235 | 3.267 | 3.292 | 3.241 | 3.271 |
| $Li_2O$ | 7.812 | 7.011 | 8.302 | 7.448 | 6.995 | 7.810 | 6.891 |
| $Na_2O$ | 2.440 | 2.453 | 2.329 | 2.354 | 2.361 | 2.343 | 2.361 |
| $K_2O$ | 0.041 | 0.036 | 0.045 | 0.038 | 0.036 | 0.045 | 0.039 |
| MgO | 0.017 | 0.018 | 0.492 | 0.491 | 0.494 | 0.496 | 0.493 |
| CaO | 0.046 | 0.043 | 0.051 | 0.045 | 0.051 | 0.051 | 0.045 |
| ZnO | 0.001 | 0.002 | 0.000 | 0.000 | 0.000 | 0.000 | 0.001 |
| $SnO_2$ | 0.062 | 0.064 | 0.062 | 0.064 | 0.063 | 0.062 | 0.063 |
| $ZrO_2$ | 0.008 | 0.008 | 0.001 | 0.001 | 0.001 | 0.001 | 0.001 |
| $TiO_2$ | 0.006 | 0.007 | 0.007 | 0.008 | 0.007 | 0.008 | 0.008 |
| $HfO_2$ | 0.000 | 0.000 | 0.000 | 0.000 | 0.000 | 0.000 | 0.000 |
| $Fe_2O_3$ | 0.021 | 0.019 | 0.022 | 0.019 | 0.019 | 0.020 | 0.019 |
| $MnO_2$ | 0.017 | 0.014 | 0.010 | 0.008 | 0.007 | 0.008 | 0.008 |
| SrO | — | — | — | — | — | — | — |
| $R_2O—Al_2O_3$ | -3.222 | -4.154 | -2.341 | -3.312 | -3.842 | -2.820 | -3.925 |
| $R_2O+RO—Al_2O_3$ | -3.159 | -4.090 | -1.798 | -2.776 | -3.297 | -2.272 | -3.386 |
| $R_2O+RO+P_2O_5—Al_2O_3$ | 0.082 | -0.828 | 1.437 | 0.491 | -0.005 | 0.969 | -0.115 |
| $Li_2O/R_2O$ | 0.759 | 0.738 | 0.778 | 0.757 | 0.745 | 0.766 | 0.742 |
| Strain (° C.) | 534 | 543 | 520 | 534 | 547 | 531 | 545 |
| Anneal (° C.) | 588 | 599 | 573 | 588 | 601 | 584 | 600 |
| Softening (° C.) | 864.2 | 883.3 | 839.4 | 866.3 | 877.2 | 856.1 | 877.3 |
| CTE ($10^{-7}$ ° $C.^{-1}$) | 50.3 | 46.9 | 52 | 48.4 | 47.4 | 50 | 46.9 |
| Density (g/cm$^3$) | 2.304 | 2.301 | 2.308 | 2.303 | 2.301 | 2.304 | 2.301 |
| Liq. T (° C.) | 1060 | 1060 | 1070 | 1055 | 1045 | 1060 | 1035 |
| Liq. Visc. (kP) | 343.9 | 500.9 | 206.1 | 402.9 | 627.4 | 275.5 | 759.5 |
| Fracture Toughness (MPa·m$^{1/2}$) | 0.721 | 0.704 | 0.749 | 0.731 | 0.709 | 0.709 | 0.719 |
| Young's Mod. (GPa) | 69.50 | 69.77 | 69.91 | 69.57 | 69.57 | 69.50 | 69.43 |

| Composition ID | Composition Mole % | | | | | | |
|---|---|---|---|---|---|---|---|
| | 36 | 37 | 38 | 39 | 40 | 41 | 42 |
| $SiO_2$ | 67.378 | 70.725 | 63.113 | 63.643 | 63.075 | 63.756 | 64.583 |
| $Al_2O_3$ | 13.373 | 12.641 | 13.943 | 14.048 | 13.352 | 13.470 | 13.645 |
| $B_2O_3$ | 6.857 | 3.866 | 7.013 | 7.362 | 7.216 | 7.336 | 7.258 |
| $P_2O_5$ | 3.311 | 0.029 | 3.214 | 3.244 | 3.179 | 3.198 | 3.249 |
| $Li_2O$ | 6.025 | 6.632 | 9.889 | 8.878 | 9.871 | 8.924 | 7.919 |
| $Na_2O$ | 2.385 | 2.441 | 2.607 | 2.618 | 2.539 | 2.558 | 2.587 |
| $K_2O$ | 0.034 | 0.034 | 0.046 | 0.041 | 0.045 | 0.042 | 0.037 |
| MgO | 0.494 | 2.736 | 0.026 | 0.023 | 0.568 | 0.568 | 0.580 |
| CaO | 0.042 | 0.055 | 0.049 | 0.045 | 0.053 | 0.048 | 0.044 |
| ZnO | 0.000 | 0.690 | 0.000 | 0.000 | 0.000 | 0.000 | 0.002 |
| $SnO_2$ | 0.064 | 0.102 | 0.053 | 0.052 | 0.054 | 0.053 | 0.054 |
| $ZrO_2$ | 0.001 | 0.000 | 0.001 | 0.001 | 0.001 | 0.001 | 0.001 |
| $TiO_2$ | 0.009 | 0.008 | 0.006 | 0.006 | 0.006 | 0.007 | 0.007 |
| $HfO_2$ | 0.000 | 0.000 | 0.000 | 0.000 | 0.000 | 0.000 | 0.000 |
| $Fe_2O_3$ | 0.017 | 0.019 | 0.025 | 0.022 | 0.025 | 0.022 | 0.020 |
| $MnO_2$ | 0.005 | 0.013 | 0.011 | 0.010 | 0.011 | 0.010 | 0.007 |
| SrO | — | — | — | — | — | — | — |
| $R_2O—Al_2O_3$ | -4.930 | -3.534 | -1.402 | -2.512 | -0.897 | -1.947 | -3.102 |
| $R_2O+RO—Al_2O_3$ | -4.395 | -0.053 | -1.327 | -2.443 | -0.276 | -1.331 | -2.475 |
| $R_2O+RO+P_2O_5—Al_2O_3$ | -1.084 | -0.024 | 1.887 | 0.801 | 2.903 | 1.867 | 0.774 |
| $Li_2O/R_2O$ | 0.714 | 0.728 | 0.788 | 0.770 | 0.793 | 0.774 | 0.751 |
| Strain (° C.) | 553 | 590 | 510 | 521 | 506 | 520 | 530 |
| Anneal (° C.) | 609 | 643 | 560 | 574 | 556 | 571 | 583 |
| Softening (° C.) | 898.9 | 909.5 | 809.7 | 834 | 799.4 | 822.9 | 849.7 |
| CTE ($10^{-7}$ ° $C.^{-1}$) | 43.4 | 45.2 | 55.1 | 52.8 | 56.2 | 52.8 | 49.9 |
| Density (g/cm$^3$) | 2.299 | 2.371 | 2.316 | 2.311 | 2.32 | 2.313 | 2.309 |
| Liq. T (° C.) | 1005 | 1175 | 1090 | 1075 | 1075 | 1065 | 1060 |
| Liq. Visc. (kP) | 2250.7 | 66.2 | 76.3 | 134.0 | 70.9 | 159.9 | 304.1 |
| Fracture Toughness (MPa·m$^{1/2}$) | 0.702 | 0.799 | 0.766 | 0.7 | 0.692 | 0.718 | 0.704 |
| Young's Mod. (GPa) | 69.50 | 79.01 | 69.77 | 69.64 | 70.53 | 70.05 | 69.84 |

TABLE 1-continued

Glass Compositions and Properties of Example 1

| | Composition Mole % | | | | | | |
|---|---|---|---|---|---|---|---|
| Composition ID | 43 | 44 | 45 | 46 | 47 | 48 | 49 |
| $SiO_2$ | 65.216 | 65.163 | 65.169 | 65.217 | 65.135 | 65.247 | 70.846 |
| $Al_2O_3$ | 13.585 | 13.599 | 13.593 | 13.609 | 13.592 | 13.559 | 12.592 |
| $B_2O_3$ | 4.707 | 4.687 | 4.658 | 4.664 | 4.728 | 4.691 | 4.108 |
| $P_2O_5$ | 3.837 | 3.821 | 3.836 | 3.847 | 3.854 | 3.855 | 0.003 |
| $Li_2O$ | 7.705 | 7.758 | 7.761 | 7.714 | 7.711 | 7.664 | 6.466 |
| $Na_2O$ | 1.876 | 1.907 | 1.945 | 1.874 | 1.878 | 1.876 | 2.417 |
| $K_2O$ | 0.040 | 0.038 | 0.039 | 0.039 | 0.039 | 0.040 | 0.003 |
| MgO | 1.937 | 1.942 | 0.982 | 0.971 | 1.933 | 0.975 | 2.773 |
| CaO | 0.997 | 0.054 | 0.048 | 1.963 | 0.067 | 0.076 | 0.718 |
| ZnO | 0.000 | 0.936 | 1.872 | 0.000 | 0.000 | 0.000 | 0.000 |
| $SnO_2$ | 0.052 | 0.052 | 0.052 | 0.052 | 0.051 | 0.049 | 0.052 |
| $ZrO_2$ | 0.001 | 0.001 | 0.001 | 0.001 | 0.001 | 0.000 | 0.001 |
| $TiO_2$ | 0.007 | 0.008 | 0.007 | 0.008 | 0.007 | 0.007 | 0.008 |
| $HfO_2$ | 0.000 | 0.000 | 0.000 | 0.000 | 0.000 | 0.000 | 0.000 |
| $Fe_2O_3$ | 0.022 | 0.021 | 0.021 | 0.023 | 0.021 | 0.022 | 0.005 |
| $MnO_2$ | 0.010 | 0.007 | 0.007 | 0.008 | 0.008 | 0.008 | 0.005 |
| SrO | 0.001 | 0.000 | 0.000 | 0.002 | 0.969 | 1.926 | 0.001 |
| $R_2O—Al_2O_3$ | -3.964 | -3.896 | -3.848 | -3.983 | -3.963 | -3.978 | -3.705 |
| $R_2O+RO—Al_2O_3$ | -1.030 | -0.964 | -0.946 | -1.048 | -1.963 | -2.927 | -0.214 |
| $R_2O+RO+P_2O_5—Al_2O_3$ | 2.807 | 2.857 | 2.889 | 2.799 | 1.891 | 0.928 | -0.211 |
| $Li_2O/R_2O$ | 0.801 | 0.800 | 0.796 | 0.801 | 0.801 | 0.800 | 0.728 |
| Strain (° C.) | 549 | 542 | 553 | 553 | 545 | 546 | 559 |
| Anneal (° C.) | 600 | 593 | 604 | 604 | 597 | 598 | 612 |
| Softening (° C.) | 858.9 | 853.7 | 862.4 | 857 | 858.3 | 861 | 875.4 |
| CTE ($10^{-7}$ °$C.^{-1}$) | 46.9 | 46.8 | 50.3 | 49.5 | 49 | 50.5 | 53.3 |
| Density (g/cm$^3$) | 2.347 | 2.358 | 2.339 | 2.343 | 2.352 | 2.37 | 2.331 |
| Liq. T (° C.) | 1115 | 1120 | 1120 | 1110 | 1105 | 1100 | 1140 |
| Liq. Visc. (kP) | 104.7 | 93.2 | 101.6 | 120.0 | 132.5 | 146.2 | 94.6 |
| Fracture Toughness (MPa·m$^{1/2}$) | — | — | — | — | — | — | 0.722 |
| Young's Mod. (GPa) | 73.50 | 72.81 | 73.50 | 72.95 | 73.02 | 72.88 | 72.95 |

| | Composition Mole % | | | | | | |
|---|---|---|---|---|---|---|---|
| Composition ID | 50 | 51 | 52 | 53 | 54 | 55 | 56 |
| $SiO_2$ | 70.699 | 70.828 | 70.725 | 70.751 | 72.113 | 70.846 | 70.699 |
| $Al_2O_3$ | 13.080 | 13.608 | 13.561 | 13.580 | 12.914 | 12.592 | 13.080 |
| $B_2O_3$ | 4.220 | 4.035 | 4.230 | 4.168 | 4.061 | 4.108 | 4.220 |
| $P_2O_5$ | 0.004 | 0.004 | 0.004 | 0.004 | 0.004 | 0.003 | 0.004 |
| $Li_2O$ | 6.470 | 6.489 | 6.491 | 6.495 | 6.151 | 6.466 | 6.470 |
| $Na_2O$ | 2.419 | 2.424 | 2.416 | 3.409 | 2.299 | 2.417 | 2.419 |
| $K_2O$ | 0.003 | 0.003 | 0.003 | 0.003 | 0.003 | 0.003 | 0.003 |
| MgO | 2.307 | 1.799 | 0.796 | 0.791 | 0.763 | 2.773 | 2.307 |
| CaO | 0.725 | 0.734 | 1.701 | 0.724 | 1.618 | 0.718 | 0.725 |
| ZnO | 0.000 | 0.000 | 0.000 | 0.000 | 0.000 | 0.000 | 0.000 |
| $SnO_2$ | 0.052 | 0.054 | 0.053 | 0.052 | 0.050 | 0.052 | 0.052 |
| $ZrO_2$ | 0.001 | 0.002 | 0.001 | 0.001 | 0.002 | 0.001 | 0.001 |
| $TiO_2$ | 0.008 | 0.008 | 0.007 | 0.008 | 0.009 | 0.008 | 0.008 |
| $HfO_2$ | 0.000 | 0.000 | 0.000 | 0.000 | 0.000 | 0.000 | 0.000 |
| $Fe_2O_3$ | 0.005 | 0.005 | 0.005 | 0.004 | 0.005 | 0.005 | 0.005 |
| $MnO_2$ | 0.000 | 0.000 | 0.000 | 0.000 | 0.000 | 0.000 | 0.000 |
| SrO | 0.001 | 0.001 | 0.001 | 0.001 | 0.001 | 0.001 | 0.001 |
| $R_2O—Al_2O_3$ | -4.188 | -4.692 | -4.650 | -3.673 | -4.460 | -3.705 | -4.188 |
| $R_2O+RO—Al_2O_3$ | -1.156 | -2.159 | -2.154 | -2.157 | -2.079 | -0.214 | -1.156 |
| $R_2O+RO+P_2O_5—Al_2O_3$ | -1.153 | -2.156 | -2.150 | -2.153 | -2.075 | -0.211 | -1.153 |
| $Li_2O/R_2O$ | 0.728 | 0.728 | 0.728 | 0.656 | 0.728 | 0.728 | 0.728 |
| Strain (° C.) | 552 | 572 | 582 | 554 | 583 | 598 | 601 |
| Anneal (° C.) | 605 | 625 | 632 | 609 | 635 | 650 | 654 |
| Softening (° C.) | 863.6 | 879.8 | 872.5 | 877.2 | 884.6 | 915 | 917 |
| CTE ($10^{-7}$ °$C.^{-1}$) | 59.7 | 48.2 | 50.4 | 60.9 | 50.6 | 46 | 45 |
| Density (g/cm$^3$) | 2.349 | 2.341 | 2.37 | 2.347 | 2.367 | 2.36 | 2.361 |
| Liq. T (° C.) | 1145 | 1140 | 1160 | 1145 | 1165 | 1180 | 1210 |
| Liq. Visc. (kP) | 62.1 | 82.9 | 37.5 | 90.6 | 46.6 | 63.2 | 45.9 |
| Fracture Toughness (MPa·m$^{1/2}$) | 0.741 | 0.742 | 0.73 | 0.733 | 0.73 | 0.766 | 0.758 |
| Young's Mod. (GPa) | 74.05 | 73.91 | 77.29 | 73.70 | 76.81 | 78.53 | 79.15 |

TABLE 1-continued

Glass Compositions and Properties of Example 1

| Composition ID | Composition Mole % | | | | | | |
|---|---|---|---|---|---|---|---|
| | 57 | 58 | 59 | 60 | 61 | 62 | 63 |
| $SiO_2$ | 68.275 | 66.556 | 67.259 | 67.294 | 65.469 | 66.423 | 67.059 |
| $Al_2O_3$ | 13.943 | 14.777 | 14.426 | 14.936 | 14.687 | 14.374 | 14.115 |
| $B_2O_3$ | 4.976 | 4.924 | 3.979 | 2.992 | 3.222 | 4.192 | 5.106 |
| $P_2O_5$ | 2.942 | 3.876 | 3.924 | 3.920 | 2.755 | 2.836 | 2.910 |
| $Li_2O$ | 7.789 | 7.815 | 7.821 | 7.766 | 7.295 | 7.437 | 7.616 |
| $Na_2O$ | 1.952 | 1.929 | 1.964 | 1.951 | 5.866 | 4.232 | 2.864 |
| $K_2O$ | 0.003 | 0.003 | 0.003 | 0.004 | 0.032 | 0.033 | 0.033 |
| MgO | 0.015 | 0.017 | 0.027 | 0.037 | 0.017 | 0.018 | 0.017 |
| CaO | 0.020 | 0.019 | 0.505 | 1.010 | 0.035 | 0.036 | 0.037 |
| ZnO | 0.001 | 0.001 | 0.001 | 0.001 | 0.507 | 0.294 | 0.116 |
| $SnO_2$ | 0.052 | 0.051 | 0.052 | 0.051 | 0.077 | 0.087 | 0.084 |
| $ZrO_2$ | 0.008 | 0.010 | 0.010 | 0.010 | 0.014 | 0.012 | 0.014 |
| $TiO_2$ | 0.010 | 0.009 | 0.009 | 0.010 | 0.000 | 0.000 | 0.000 |
| $HfO_2$ | 0.000 | 0.000 | 0.000 | 0.000 | — | — | — |
| $Fe_2O_3$ | 0.005 | 0.005 | 0.005 | 0.006 | 0.018 | 0.019 | 0.019 |
| $MnO_2$ | 0.003 | 0.000 | 0.000 | 0.002 | 0.006 | 0.008 | 0.010 |
| SrO | — | — | — | — | — | — | — |
| $R_2O—Al_2O_3$ | -4.200 | -5.031 | -4.639 | -5.216 | -1.495 | -2.672 | -3.602 |
| $R_2O+RO—Al_2O_3$ | -4.164 | -4.994 | -4.106 | -4.167 | -0.937 | -2.324 | -3.433 |
| $R_2O+RO+P_2O_5—Al_2O_3$ | -1.222 | -1.118 | -0.182 | -0.247 | 1.818 | 0.512 | -0.523 |
| $Li_2O/R_2O$ | 0.799 | 0.802 | 0.799 | 0.799 | 0.553 | 0.636 | 0.724 |
| Strain (° C.) | 577 | 582 | 573 | 585 | 550 | 548 | 553 |
| Anneal (° C.) | 633 | 639 | 630 | 641 | 604 | 603 | 608 |
| Softening (° C.) | 916 | 915.3 | 916.2 | 931.6 | — | 892.6 | — |
| CTE ($10^{-7}$ ° $C.^{-1}$) | 46.1 | 45.8 | 46.9 | 47 | — | 53.8 | — |
| Density (g/cm$^3$) | 2.312 | 2.311 | 2.319 | 2.334 | — | 2.336 | — |
| Liq. T (° C.) | 1160 | 1195 | 1140 | 1180 | 1095 | 1105 | 1105 |
| Liq. Visc. (kP) | 129.0 | 58.3 | 199.1 | 105.5 | 237.9 | 193.0 | 213.9 |
| Fracture Toughness (MPa · m$^{1/2}$) | 0.722 | 0.712 | 0.732 | 0.712 | — | — | — |
| Young's Mod. (GPa) | 72.05 | 71.64 | 72.33 | 74.33 | 73.22 | 72.60 | 71.91 |

| Composition ID | Composition Mole % | | | | | | |
|---|---|---|---|---|---|---|---|
| | 64 | 65 | 66 | 67 | 68 | 69 | 70 |
| $SiO_2$ | 67.580 | 67.720 | 67.076 | 66.660 | 66.588 | 66.233 | 66.389 |
| $Al_2O_3$ | 13.908 | 13.907 | 13.767 | 13.660 | 13.609 | 13.653 | 13.628 |
| $B_2O_3$ | 5.603 | 5.436 | 5.531 | 5.394 | 5.287 | 5.417 | 5.321 |
| $P_2O_5$ | 2.953 | 2.944 | 3.156 | 3.318 | 3.373 | 3.364 | 3.365 |
| $Li_2O$ | 7.810 | 7.840 | 7.753 | 7.743 | 7.744 | 7.796 | 7.773 |
| $Na_2O$ | 1.937 | 1.917 | 1.906 | 1.894 | 1.908 | 1.912 | 1.916 |
| $K_2O$ | 0.032 | 0.033 | 0.032 | 0.032 | 0.032 | 0.011 | 0.003 |
| MgO | 0.018 | 0.020 | 0.624 | 1.133 | 1.284 | 1.473 | 1.478 |
| CaO | 0.036 | 0.038 | 0.042 | 0.045 | 0.046 | 0.030 | 0.023 |
| ZnO | 0.002 | 0.000 | 0.000 | 0.000 | 0.000 | 0.000 | 0.000 |
| $SnO_2$ | 0.081 | 0.099 | 0.075 | 0.080 | 0.087 | 0.090 | 0.087 |
| $ZrO_2$ | 0.012 | 0.018 | 0.010 | 0.011 | 0.014 | 0.013 | 0.014 |
| $TiO_2$ | 0.000 | 0.000 | 0.000 | 0.000 | 0.000 | 0.000 | 0.000 |
| $HfO_2$ | — | — | — | — | — | — | — |
| $Fe_2O_3$ | 0.019 | 0.020 | 0.019 | 0.020 | 0.020 | 0.009 | 0.005 |
| $MnO_2$ | 0.008 | 0.010 | 0.008 | 0.010 | 0.009 | 0.000 | 0.000 |
| SrO | — | — | — | — | — | — | — |
| $R_2O—Al_2O_3$ | -4.129 | -4.118 | -4.077 | -3.991 | -3.926 | -3.933 | -3.937 |
| $R_2O+RO—Al_2O_3$ | -4.073 | -4.060 | -3.410 | -2.813 | -2.596 | -2.431 | -2.436 |
| $R_2O+RO+P_2O_5—Al_2O_3$ | -1.120 | -1.116 | -0.255 | 0.506 | 0.777 | 0.933 | 0.929 |
| $Li_2O/R_2O$ | 0.799 | 0.801 | 0.800 | 0.801 | 0.800 | 0.802 | 0.802 |
| Strain (° C.) | 556 | 562 | 552 | 548 | 548 | 555 | 554 |
| Anneal (° C.) | 611 | 618 | 606 | 602 | 602 | 608 | 608 |
| Softening (° C.) | — | — | — | — | 885.8 | — | — |
| CTE ($10^{-7}$ ° $C.^{-1}$) | — | — | — | — | 44.9 | — | — |
| Density (g/cm$^3$) | 2.306 | 2.307 | 2.309 | — | 2.314 | — | — |
| Liq. T (° C.) | 1140 | 1160 | 1075 | 1095 | 1080 | 1095 | 1095 |
| Liq. Visc. (kP) | 130.7 | 99.3 | 380.6 | 241.5 | 320.2 | 226.6 | 227.0 |
| Fracture Toughness (MPa · m$^{1/2}$) | — | — | — | — | — | — | — |
| Young's Mod. (GPa) | 71.36 | 72.12 | 71.50 | 72.74 | 72.05 | 71.91 | 72.46 |

TABLE 1-continued

Glass Compositions and Properties of Example 1

| | Composition Mole % | | | | | | |
|---|---|---|---|---|---|---|---|
| Composition ID | 71 | 72 | 73 | 74 | 75 | 76 | 77 |
| $SiO_2$ | 66.295 | 65.647 | 65.470 | 65.706 | 66.240 | 66.626 | 67.088 |
| $Al_2O_3$ | 13.375 | 13.363 | 13.402 | 13.724 | 13.786 | 13.811 | 14.051 |
| $B_2O_3$ | 5.288 | 4.975 | 4.868 | 4.817 | 4.930 | 4.985 | 5.007 |
| $P_2O_5$ | 3.462 | 3.710 | 3.826 | 3.818 | 3.826 | 3.847 | 3.876 |
| $Li_2O$ | 7.754 | 7.710 | 7.509 | 7.738 | 7.672 | 7.731 | 7.905 |
| $Na_2O$ | 1.920 | 1.895 | 1.891 | 1.910 | 1.945 | 1.953 | 1.978 |
| $K_2O$ | 0.003 | 0.003 | 0.003 | 0.003 | 0.003 | 0.003 | 0.002 |
| MgO | 1.782 | 2.570 | 2.937 | 2.197 | 1.520 | 0.967 | 0.028 |
| CaO | 0.024 | 0.028 | 0.028 | 0.026 | 0.022 | 0.018 | 0.014 |
| ZnO | 0.000 | 0.000 | 0.000 | 0.000 | 0.000 | 0.000 | 0.000 |
| $SnO_2$ | 0.084 | 0.084 | 0.044 | 0.042 | 0.037 | 0.038 | 0.035 |
| $ZrO_2$ | 0.009 | 0.010 | 0.015 | 0.014 | 0.015 | 0.016 | 0.010 |
| $TiO_2$ | 0.000 | 0.000 | 0.000 | 0.000 | 0.000 | 0.000 | 0.000 |
| $HfO_2$ | — | — | — | — | — | — | — |
| $Fe_2O_3$ | 0.004 | 0.005 | 0.005 | 0.005 | 0.005 | 0.004 | 0.004 |
| $MnO_2$ | 0.000 | 0.000 | 0.000 | 0.000 | 0.000 | 0.000 | 0.000 |
| SrO | — | — | — | — | — | — | — |
| $R_2O$—$Al_2O_3$ | −3.698 | −3.756 | −3.999 | −4.073 | −4.166 | −4.124 | −4.166 |
| $R_2O$+RO—$Al_2O_3$ | −1.892 | −1.157 | −1.033 | −1.850 | −2.625 | −3.140 | −4.123 |
| $R_2O$+RO+$P_2O_5$—$Al_2O_3$ | 1.570 | 2.553 | 2.793 | 1.968 | 1.201 | 0.707 | −0.247 |
| $Li_2O/R_2O$ | 0.801 | 0.803 | 0.799 | 0.802 | 0.798 | 0.798 | 0.800 |
| Strain (° C.) | 552 | 553 | 554 | 554 | 557 | 560 | 561 |
| Anneal (° C.) | 606 | 605 | 605 | 607 | 611 | 615 | 618 |
| Softening (° C.) | — | — | 878.9 | — | — | — | — |
| CTE ($10^{-7}$ ° $C.^{-1}$) | — | — | 44.5 | — | — | — | — |
| Density (g/cm³) | — | — | 2.323 | 2.319 | 2.312 | — | 2.299 |
| Liq. T (° C.) | 1080 | 1105 | 1110 | 1095 | 1105 | 1085 | 1100 |
| Liq. Visc. (kP) | 287.5 | 159.0 | 132.3 | 212.7 | 218.4 | 386.7 | 371.4 |
| Fracture Toughness (MPa·$m^{1/2}$) | — | — | — | — | — | — | — |
| Young's Mod. (GPa) | 72.74 | 73.02 | 73.36 | 73.02 | 73.43 | 72.05 | 71.15 |

| | Composition Mole % | | | | | | |
|---|---|---|---|---|---|---|---|
| Composition ID | 78 | 79 | 80 | 81 | 82 | 83 | 84 |
| $SiO_2$ | 67.141 | 67.052 | 67.879 | 68.890 | 69.710 | 70.794 | 70.029 |
| $Al_2O_3$ | 14.181 | 14.128 | 13.897 | 13.534 | 13.241 | 12.979 | 13.370 |
| $B_2O_3$ | 5.134 | 5.085 | 4.646 | 4.431 | 4.336 | 4.060 | 3.953 |
| $P_2O_5$ | 3.977 | 3.987 | 3.068 | 2.022 | 1.268 | 0.011 | 0.474 |
| $Li_2O$ | 8.236 | 8.587 | 8.290 | 7.652 | 7.015 | 6.202 | 6.690 |
| $Na_2O$ | 1.236 | 1.062 | 1.255 | 1.556 | 1.786 | 2.156 | 2.588 |
| $K_2O$ | 0.003 | 0.002 | 0.003 | 0.003 | 0.003 | 0.004 | 0.003 |
| MgO | 0.018 | 0.023 | 0.467 | 0.960 | 1.325 | 1.930 | 1.462 |
| CaO | 0.013 | 0.013 | 0.428 | 0.897 | 1.251 | 1.808 | 1.382 |
| ZnO | 0.000 | 0.000 | 0.000 | 0.000 | 0.000 | 0.000 | 0.000 |
| $SnO_2$ | 0.045 | 0.046 | 0.049 | 0.040 | 0.040 | 0.045 | 0.039 |
| $ZrO_2$ | 0.011 | 0.011 | 0.015 | 0.010 | 0.021 | 0.006 | 0.005 |
| $TiO_2$ | 0.000 | 0.000 | 0.000 | 0.000 | 0.000 | 0.000 | 0.000 |
| $HfO_2$ | — | — | — | — | — | — | — |
| $Fe_2O_3$ | 0.004 | 0.004 | 0.004 | 0.005 | 0.005 | 0.006 | 0.005 |
| $MnO_2$ | 0.000 | 0.000 | 0.000 | 0.000 | 0.000 | 0.000 | 0.000 |
| SrO | — | — | — | — | — | — | — |
| $R_2O$—$Al_2O_3$ | −4.705 | −4.477 | −4.349 | −4.323 | −4.436 | −4.617 | −4.089 |
| $R_2O$+RO—$Al_2O_3$ | −4.674 | −4.440 | −3.454 | −2.465 | −1.860 | −0.880 | −1.245 |
| $R_2O$+RO+$P_2O_5$—$Al_2O_3$ | −0.697 | −0.453 | −0.386 | −0.443 | −0.593 | −0.868 | −0.771 |
| $Li_2O/R_2O$ | 0.869 | 0.890 | 0.868 | 0.831 | 0.797 | 0.742 | 0.721 |
| Strain (° C.) | 565 | 564 | 571 | 581 | 585 | 601 | 595 |
| Anneal (° C.) | 620 | 619 | 626 | 636 | 639 | 654 | 649 |
| Softening (° C.) | — | 907.4 | — | — | — | — | — |
| CTE ($10^{-7}$ ° $C.^{-1}$) | — | 43.6 | — | — | — | — | — |
| Density (g/cm³) | — | 2.297 | — | — | — | 2.359 | — |
| Liq. T (° C.) | 1120 | 1125 | 1140 | 1140 | 1170 | 1160 | 1170 |
| Liq. Visc. (kP) | 206.3 | 190.3 | 132.4 | 139.6 | 80.3 | 101.0 | 86.3 |
| Fracture Toughness (MPa·$m^{1/2}$) | — | — | — | — | — | — | — |
| Young's Mod. (GPa) | 71.08 | 70.74 | 73.02 | 74.88 | 76.46 | 78.88 | 78.19 |

TABLE 1-continued

Glass Compositions and Properties of Example 1

| | Composition Mole % | | | | | | |
|---|---|---|---|---|---|---|---|
| Composition ID | 85 | 86 | 87 | 88 | 89 | 90 | 91 |
| $SiO_2$ | 69.183 | 67.958 | 67.657 | 67.562 | 67.122 | 66.929 | 66.957 |
| $Al_2O_3$ | 14.117 | 15.142 | 14.961 | 14.522 | 14.255 | 14.107 | 14.019 |
| $B_2O_3$ | 3.602 | 3.011 | 3.567 | 4.337 | 5.309 | 5.635 | 5.545 |
| $P_2O_5$ | 1.079 | 1.951 | 2.285 | 2.739 | 3.317 | 3.454 | 3.382 |
| $Li_2O$ | 7.106 | 7.856 | 7.812 | 7.924 | 8.071 | 8.223 | 8.393 |
| $Na_2O$ | 3.129 | 3.900 | 3.604 | 2.814 | 1.829 | 1.543 | 1.609 |
| $K_2O$ | 0.003 | 0.003 | 0.003 | 0.003 | 0.003 | 0.003 | 0.003 |
| MgO | 0.894 | 0.062 | 0.026 | 0.023 | 0.020 | 0.020 | 0.015 |
| CaO | 0.837 | 0.061 | 0.024 | 0.019 | 0.017 | 0.017 | 0.016 |
| ZnO | 0.000 | 0.000 | 0.000 | 0.000 | 0.000 | 0.000 | 0.000 |
| $SnO_2$ | 0.039 | 0.043 | 0.048 | 0.046 | 0.044 | 0.050 | 0.045 |
| $ZrO_2$ | 0.006 | 0.009 | 0.008 | 0.008 | 0.010 | 0.016 | 0.013 |
| $TiO_2$ | 0.000 | 0.000 | 0.000 | 0.000 | 0.000 | 0.000 | 0.000 |
| $HfO_2$ | — | — | — | — | — | — | — |
| $Fe_2O_3$ | 0.005 | 0.004 | 0.004 | 0.004 | 0.004 | 0.004 | 0.005 |
| $MnO_2$ | 0.000 | 0.000 | 0.000 | 0.000 | 0.000 | 0.000 | 0.000 |
| SrO | — | — | — | — | — | — | — |
| $R_2O$—$Al_2O_3$ | −3.880 | −3.383 | −3.543 | −3.781 | −4.352 | −4.339 | −4.014 |
| $R_2O$+RO—$Al_2O_3$ | −2.148 | −3.259 | −3.493 | −3.739 | −4.316 | −4.302 | −3.984 |
| $R_2O$+RO+$P_2O_5$—$Al_2O_3$ | −1.069 | −1.308 | −1.207 | −1.000 | −0.999 | −0.849 | −0.602 |
| $Li_2O/R_2O$ | 0.694 | 0.668 | 0.684 | 0.738 | 0.815 | 0.842 | 0.839 |
| Strain (° C.) | 593 | 595 | 584 | 573 | 563 | 560 | 556 |
| Anneal (° C.) | 648 | 651 | 640 | 629 | 619 | 615 | 612 |
| Softening (° C.) | — | — | — | — | — | — | — |
| CTE ($10^{-7}$ °$C.^{-1}$) | — | — | — | — | — | — | — |
| Density (g/cm³) | 2.351 | 2.344 | — | — | — | 2.3 | 2.3 |
| Liq. T (° C.) | 1185 | 1180 | 1185 | 1160 | 1155 | 1140 | 1155 |
| Liq. Visc. (kP) | 71.1 | 91.3 | 76.1 | 107.0 | 97.9 | 121.6 | 95.0 |
| Fracture Toughness (MPa · m$^{1/2}$) | — | — | — | — | — | — | — |
| Young's Mod. (GPa) | 77.01 | 75.70 | 74.67 | 73.15 | 71.64 | 71.08 | 71.22 |

| | Composition Mole % | | | | | | |
|---|---|---|---|---|---|---|---|
| Composition ID | 92 | 93 | 94 | 95 | 96 | 97 | 98 |
| $SiO_2$ | 66.882 | 67.005 | 66.936 | 66.907 | 67.010 | 66.976 | 66.996 |
| $Al_2O_3$ | 14.012 | 14.157 | 14.150 | 14.117 | 13.974 | 14.129 | 14.122 |
| $B_2O_3$ | 5.660 | 5.417 | 5.608 | 5.121 | 4.581 | 3.897 | 3.514 |
| $P_2O_5$ | 2.857 | 2.050 | 1.752 | 2.000 | 2.600 | 3.219 | 3.451 |
| $Li_2O$ | 8.290 | 8.200 | 8.071 | 8.271 | 8.222 | 8.178 | 8.354 |
| $Na_2O$ | 2.191 | 3.073 | 3.380 | 3.489 | 3.509 | 3.490 | 3.462 |
| $K_2O$ | 0.003 | 0.003 | 0.003 | 0.003 | 0.003 | 0.003 | 0.003 |
| MgO | 0.020 | 0.020 | 0.016 | 0.015 | 0.016 | 0.020 | 0.018 |
| CaO | 0.014 | 0.014 | 0.014 | 0.014 | 0.014 | 0.014 | 0.014 |
| ZnO | 0.000 | 0.000 | 0.000 | 0.000 | 0.000 | 0.000 | 0.000 |
| $SnO_2$ | 0.052 | 0.048 | 0.053 | 0.049 | 0.052 | 0.051 | 0.050 |
| $ZrO_2$ | 0.014 | 0.009 | 0.013 | 0.012 | 0.013 | 0.017 | 0.011 |
| $TiO_2$ | 0.000 | 0.000 | 0.000 | 0.000 | 0.000 | 0.000 | 0.000 |
| $HfO_2$ | — | — | — | — | — | — | — |
| $Fe_2O_3$ | 0.004 | 0.004 | 0.004 | 0.004 | 0.004 | 0.004 | 0.004 |
| $MnO_2$ | 0.000 | 0.000 | 0.000 | 0.000 | 0.000 | 0.000 | 0.000 |
| SrO | — | — | — | — | — | — | — |
| $R_2O$—$Al_2O_3$ | −3.527 | −2.882 | −2.697 | −2.354 | −2.239 | −2.458 | −2.304 |
| $R_2O$+RO—$Al_2O_3$ | −3.493 | −2.848 | −2.666 | −2.325 | −2.208 | −2.423 | −2.271 |
| $R_2O$+RO+$P_2O_5$—$Al_2O_3$ | −0.636 | −0.797 | −0.915 | −0.326 | 0.392 | 0.796 | 1.180 |
| $Li_2O/R_2O$ | 0.791 | 0.727 | 0.705 | 0.703 | 0.701 | 0.701 | 0.707 |
| Strain (° C.) | 553 | 555 | 554 | 556 | 554 | 559 | 557 |
| Anneal (° C.) | 608 | 609 | 608 | 610 | 608 | 614 | 612 |
| Softening (° C.) | — | 885.4 | — | — | — | — | — |
| CTE ($10^{-7}$ °$C.^{-1}$) | — | 50.8 | — | — | — | — | — |
| Density (g/cm³) | — | 2.319 | 2.323 | 2.324 | — | — | — |
| Liq. T (° C.) | 1145 | 1140 | 1130 | 1135 | 1135 | 1135 | 1115 |
| Liq. Visc. (kP) | 98.2 | 93.0 | 104.6 | 100.3 | 116.3 | 138.4 | 197.7 |
| Fracture Toughness (MPa · m$^{1/2}$) | — | — | — | — | — | — | — |
| Young's Mod. (GPa) | 71.43 | 82.87 | 73.15 | 73.02 | 72.33 | 72.60 | 72.88 |

TABLE 1-continued

Glass Compositions and Properties of Example 1

| Composition ID | Composition Mole % | | | | |
|---|---|---|---|---|---|
| | 99 | 100 | 101 | 102 | 103 |
| $SiO_2$ | 67.305 | 67.833 | 68.613 | 69.083 | 69.867 |
| $Al_2O_3$ | 14.017 | 13.832 | 13.418 | 13.260 | 12.943 |
| $B_2O_3$ | 3.676 | 3.674 | 3.842 | 3.985 | 4.098 |
| $P_2O_5$ | 3.102 | 2.609 | 1.944 | 1.222 | 0.449 |
| $Li_2O$ | 8.051 | 7.793 | 7.481 | 7.101 | 6.709 |
| $Na_2O$ | 3.479 | 3.516 | 3.484 | 3.617 | 3.645 |
| $K_2O$ | 0.003 | 0.003 | 0.003 | 0.003 | 0.003 |
| MgO | 0.152 | 0.351 | 0.597 | 0.853 | 1.127 |
| CaO | 0.144 | 0.322 | 0.555 | 0.812 | 1.088 |
| ZnO | 0.000 | 0.000 | 0.000 | 0.000 | 0.000 |
| $SnO_2$ | 0.049 | 0.051 | 0.046 | 0.047 | 0.043 |
| $ZrO_2$ | 0.018 | 0.013 | 0.010 | 0.011 | 0.022 |
| $TiO_2$ | 0.000 | 0.000 | 0.000 | 0.000 | 0.000 |
| $HfO_2$ | — | — | — | — | — |
| $Fe_2O_3$ | 0.004 | 0.004 | 0.005 | 0.005 | 0.005 |
| $MnO_2$ | 0.000 | 0.000 | 0.000 | 0.000 | 0.000 |
| SrO | — | — | — | — | — |
| $R_2O$—$Al_2O_3$ | −2.484 | −2.520 | −2.450 | −2.538 | −2.585 |
| $R_2O$+RO—$Al_2O_3$ | −2.188 | −1.848 | −1.297 | −0.873 | −0.370 |
| $R_2O$+RO+$P_2O_5$—$Al_2O_3$ | 0.914 | 0.761 | 0.647 | 0.349 | 0.079 |
| $Li_2O/R_2O$ | 0.698 | 0.689 | 0.682 | 0.662 | 0.648 |
| Strain (° C.) | 562 | 562 | 568 | 572 | 577 |
| Anneal (° C.) | 617 | 616 | 622 | 626 | 631 |
| Softening (° C.) | — | — | — | — | 903.3 |
| CTE ($10^{-7}$ ° $C.^{-1}$) | — | — | — | — | 49.9 |
| Density (g/cm$^3$) | 2.327 | — | 2.336 | — | 2.35 |
| Liq. T (° C.) | 1135 | 1140 | 1135 | 1145 | 1150 |
| Liq. Visc. (kP) | 140.5 | 131.2 | 147.5 | 120.6 | 110.1 |
| Fracture Toughness (MPa·m$^{1/2}$) | — | — | — | — | — |
| Young's Mod. (GPa) | 74.19 | 73.50 | 74.19 | 75.70 | 76.95 |

Example 2

Two sets of samples for each of three of the exemplary glass compositions (compositions 26, 65, and 77) were further processed and ion exchange strengthened. The compositions before ion exchange for each of the three exemplary glass compositions are provided below in Table 2. One set of the samples for each of the exemplary glass compositions of Example 2 was fictivated by heat treating the samples for 4 minutes at a temperature at which the viscosity of the glass composition is $10^{11}$ poise and then quenching the samples in flowing air at ambient temperature. These fictivated samples are designed with suffix "-F" in Table 2 below. This thermal treatment mimics the thermal history of a fusion drawn glass which is quenched. A second set of samples for each exemplary glass composition of Example 2 was simply annealed. These samples are designated in Table 2 with the suffix "-A."

The samples were then ion exchanged to produce a parabolic stress profile in each of the samples. Each of the samples of the glass compositions in Example 2 had a thickness of 0.8 mm. Samples 26-F2, 65-A, 65-F, 77-A, and 77-F were ion exchanged in a molten salt bath comprising 80 weight percent (wt. %) $KNO_3$ and 20 wt. % $NaNO_3$. Sample 26-F1 was ion exchanged in a molten salt bath comprising 100 wt. % $NaNO_3$. The samples were ion exchanged at a temperature of 430° C. for an immersion time sufficient to attain the parabolic stress profile. The immersion times for each sample are provided in Table 2 below.

TABLE 2

Compositions and Properties of the Glass Compositions of Example 2

| Sample No. | 26-F1 | 26-F2 | 65-A | 65-F | 77-A | 77-F |
|---|---|---|---|---|---|---|
| Ref No. in FIG. 2 | 120 | 122 | 130 | 132 | 140 | 142 |
| $SiO_2$ | 67.097 | 67.097 | 67.72 | 67.72 | 67.088 | 67.088 |
| $Al_2O_3$ | 13.971 | 13.971 | 13.91 | 13.91 | 14.051 | 14.051 |
| $Li_2O$ | 7.919 | 7.919 | 7.84 | 7.84 | 7.905 | 7.905 |
| $Na_2O$ | 1.931 | 1.931 | 1.92 | 1.92 | 1.978 | 1.978 |
| $K_2O$ | 0.040 | 0.040 | .03 | .03 | — | — |
| $B_2O_3$ | 4.890 | 4.890 | 5.44 | 5.44 | 5.007 | 5.007 |
| $P_2O_5$ | 3.966 | 3.966 | 2.94 | 2.94 | 3.876 | 3.876 |
| MgO | 0.025 | 0.025 | .02 | .02 | 0.028 | 0.028 |
| CaO | 0.046 | 0.046 | .04 | .04 | 0.014 | 0.014 |

TABLE 2-continued

Compositions and Properties of the Glass Compositions of Example 2

| | | | | | | |
|---|---|---|---|---|---|---|
| $R_2O$—$Al_2O_3$ | −4.81 | −4.81 | −4.12 | −4.12 | −4.17 | −4.17 |
| ($R_2O$+RO—$Al_2O_3$) | −4.00 | −4.00 | −4.06 | −4.06 | −4.12 | −4.12 |
| $R_2O$+RO+ $P_2O_5$—$Al_2O_3$ | −0.04 | −0.04 | −1.12 | −1.12 | −0.25 | −0.25 |
| $Li_2O/R_2O$ | 0.80 | 0.80 | .80 | .80 | 0.80 | 0.80 |

Properties of the Glass Compositions

| Treatment | fictivated | fictivated | annealed | fictivated | annealed | fictivated |
|---|---|---|---|---|---|---|
| Strain T (° C.) | 566 | 566 | 562 | 562 | 561 | 561 |
| Anneal T (° C.) | 623 | 623 | 618 | 618 | 618 | 618 |
| Softening T (° C.) | — | — | — | — | — | — |
| CTE ($10^{-7}$/° C.) | 47 | 47 | — | — | — | — |
| Density (g/cc) | 2.31 | 2.31 | 2.31 | 2.31 | 2.30 | 2.30 |
| Liquidus T (° C.) | 1100 | 1100 | 1160 | 1160 | 1100 | 1100 |
| Liquidus Viscosity (kP) | 384.4 | 384.4 | 99.3 | 99.3 | 371.4 | 371.4 |
| Young's Modulus (GPa) | 70.88 | 70.88 | 72.12 | 72.12 | 71.15 | 561 |
| Na:K in Ion Exchange Bath | 100:0 | 20:80 | 20:80 | 20:80 | 20:80 | 20:80 |
| Bath Temp (° C.) | 430 | 430 | 430 | 430 | 430 | 430 |
| Ion Exchange Time (hr) | 3 | 3 | 5 | 3.5 | 4 | 3 |
| CS (MPa) | — | 401 | 434 | 403 | 425 | 413 |
| DOL (μm) | — | 12.8 | 10.9 | 11.4 | 11.6 | 12.3 |
| DOC (μm) | 163 | 163 | 143 | 158 | 159 | 158 |
| CT (MPa) | 67 | 67 | 90 | 67 | 82 | 65 |

Referring to FIG. 1, the stress profiles for samples 77-A and 77-F as a function of the position through the thickness of the glass samples are illustrated. The annealed glass of sample 77-A (reference no. 140 in FIG. 1) attained a higher central tension (CT) of 81.7 MPa, as shown in FIG. 1, but takes a longer ion exchange immersion time to achieve the peak CT. The fictivated glass composition of sample 77-F (reference no. 142 in FIG. 1) gets to peak CT in a shorter immersion time of only 3 hours compared to 4 hours for sample 77-A. However, fictivated sample 77-F exhibited a lower peak CT of 61.6 MPa. The results in FIG. 1 are for samples ion exchanged in an ion exchange bath that included 80 wt. % KNOB and 20 wt. % NaNO₃. The same glass compositions achieve a peak CT of greater than 90 MPa when ion exchanged in 100% NaNO₃, but with lower compressive stress at the surface.

It should now be understood that the glass compositions described herein exhibit chemical durability as well as mechanical durability following ion exchange. These properties make the glass compositions well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article comprising a composition, the composition comprising:

greater than or equal to 50 mol. % and less than or equal to 80 mol. % $SiO_2$;

greater than or equal to 7 mol. % and less than or equal to 25 mol. % $Al_2O_3$;

greater than or equal to 2 mol. % and less than or equal to 14 mol. % $Li_2O$;

greater than or equal to 3 mol. % and less than or equal to 15 mol. % $B_2O_3$;

greater than or equal to 0.1 mol. % $Na_2O$; and greater than 0 mol. % and less than or equal to 4 mol. % $TiO_2$, wherein ($Al_2O_3$ (mol. %)-$R_2O$ (mol. %)-RO (mol. %)) is greater than or equal to 0 mol. %, where $R_2O$ (mol. %) is the sum of the molar amounts of $Li_2O$, $Na_2O$, $K_2O$, $Rb_2O$, and $Cs_2O$ in the composition and RO (mol. %) is the sum of the molar amounts of BeO, MgO, CaO, SrO, BaO, and ZnO in the composition, wherein ($Al_2O_3$ (mol. %)-$R_2O$ (mol. %)-RO (mol. %)-$P_2O_5$ (mol. %)) is less than or equal to 2 mol. %, and wherein $R_2O$ (mol. %) is less than or equal to 14 mol. %.

2. The glass article of claim 1, wherein a molar ratio of ($Li_2O$ (mol. %))/($R_2O$ (mol. %)) is greater than or equal to 0.5.

3. The glass article of claim 1, wherein the composition further comprises greater than or equal to 0.4 mol. % and less than or equal to 10 mol. % $P_2O_5$.

4. The glass article of claim 3, wherein ($Al_2O_3$ (mol. %)-$R_2O$ (mol. %)-RO (mol. %)-$P_2O_5$ (mol. %)) is greater than or equal to −2.

5. The glass article of claim 1, wherein ($Li_2O$ (mol. %)+$Al_2O_3$ (mol. %)) is greater than or equal to two times $B_2O_3$ (mol. %).

6. The glass article of claim 1, wherein the composition further comprises greater than or equal to 1.5 mol. % and less than or equal to 6 mol. % $Na_2O$.

7. The glass article of claim 1, wherein the composition further comprises less than or equal to 0.35 mol. % $SnO_2$.

8. The glass article of claim 1, wherein the composition has a liquidus temperature of less than or equal to 1300° C.

9. The glass article of claim 1, wherein the composition has a liquidus viscosity of greater than 20 kP, as measured according to ASTM C965-96(2012).

10. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover substrate disposed over the display,
wherein at least one of a portion of the housing or the cover substrate comprises the glass article of claim 1.

11. The glass article of claim 1, wherein the composition further comprises greater than 0 mol. % and less than or equal to 5 mol % MgO.

* * * * *